United States Patent
Moynihan et al.

(10) Patent No.: US 9,848,049 B2
(45) Date of Patent: Dec. 19, 2017

(54) SERVICE PREEMPTION SELECTION SYSTEMS AND METHODS IN NETWORKS

(71) Applicant: Ciena Corporation, Hanover, MD (US)

(72) Inventors: Jeffrey Scott Moynihan, Cumming, GA (US); Srinivasa Thirumalasetty, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 288 days.

(21) Appl. No.: 14/875,760

(22) Filed: Oct. 6, 2015

(65) Prior Publication Data

US 2017/0099354 A1    Apr. 6, 2017

(51) Int. Cl.
*H04L 29/08*    (2006.01)
*H04L 12/701*    (2013.01)

(52) U.S. Cl.
CPC ........... *H04L 67/141* (2013.01); *H04L 45/00* (2013.01)

(58) Field of Classification Search
None
See application file for complete search history.

(56) References Cited

U.S. PATENT DOCUMENTS

| | | |
|---|---|---|
| 7,143,161 B2 | 11/2006 | Brissette |
| 7,688,732 B2 | 3/2010 | Manzalini et al. |
| 8,259,733 B2 | 9/2012 | Conklin et al. |
| 8,356,233 B2 | 1/2013 | Nichols et al. |
| 8,417,111 B2 | 4/2013 | Moynihan et al. |
| 8,559,812 B2 | 10/2013 | Oltman et al. |
| 8,699,346 B2 | 4/2014 | Madrahalli et al. |
| 8,817,824 B2 | 8/2014 | Connolly et al. |
| 8,854,955 B2 | 10/2014 | Prakash et al. |
| 2008/0137659 A1* | 6/2008 | Levy-Abegnoli ....... H04L 45/00 370/392 |
| 2013/0114953 A1 | 5/2013 | Moynihan et al. |
| 2013/0242721 A1 | 9/2013 | Moynihan et al. |
| 2014/0314402 A1 | 10/2014 | Moynihan et al. |

(Continued)

FOREIGN PATENT DOCUMENTS

EP    1981221 A1    10/2008

OTHER PUBLICATIONS

Ceccarelli et al., "Traffic Engineering Extensions to OSPF for Generalized MPLS (GMPLS) Control of Evolving G.709 OTN Networks draft-ietf-ccamp-gmpls-ospf-g709v3-13," CCAMP Working Group, Dec. 11, 2013, pp. 1-35.

(Continued)

*Primary Examiner* — Jeffrey R Swearingen
(74) *Attorney, Agent, or Firm* — Clements Bernard Walker PLLC; Christopher L. Bernard; Lawrence A. Baratta, Jr.

(57) ABSTRACT

Systems and methods for service preemption selection implemented by a node in a network include receiving, from an ingress link, a request to establish a service on a path in the network while preempting one or more existing services if required to establish the service, wherein the request comprises a list of any previously selected services for preemption and an indication of whether preemption is required on the ingress link; selecting, if required based on the indication, one or more services for preemption on the ingress link based on service selection criteria; and forwarding the request on an egress link to an adjacent node with any updates based on the selecting.

18 Claims, 19 Drawing Sheets

(56) References Cited

U.S. PATENT DOCUMENTS

2015/0023368 A1    1/2015  Connolly et al.

OTHER PUBLICATIONS

Mannie, "Generalized Multi-Protocol Label Switching (GMPLS) Architecture," Network Working Group, Oct. 2004, pp. 1-69.

"Distributed Call and Connection Management: Signalling mechanism using GMPLS RSVP-TE," International Telecommunication Union, Mar. 2003, pp. 1-46.

"Architecture for the automatically switched optical network," International Telecommunication Union, Feb. 2012, pp. 1-124.

* cited by examiner

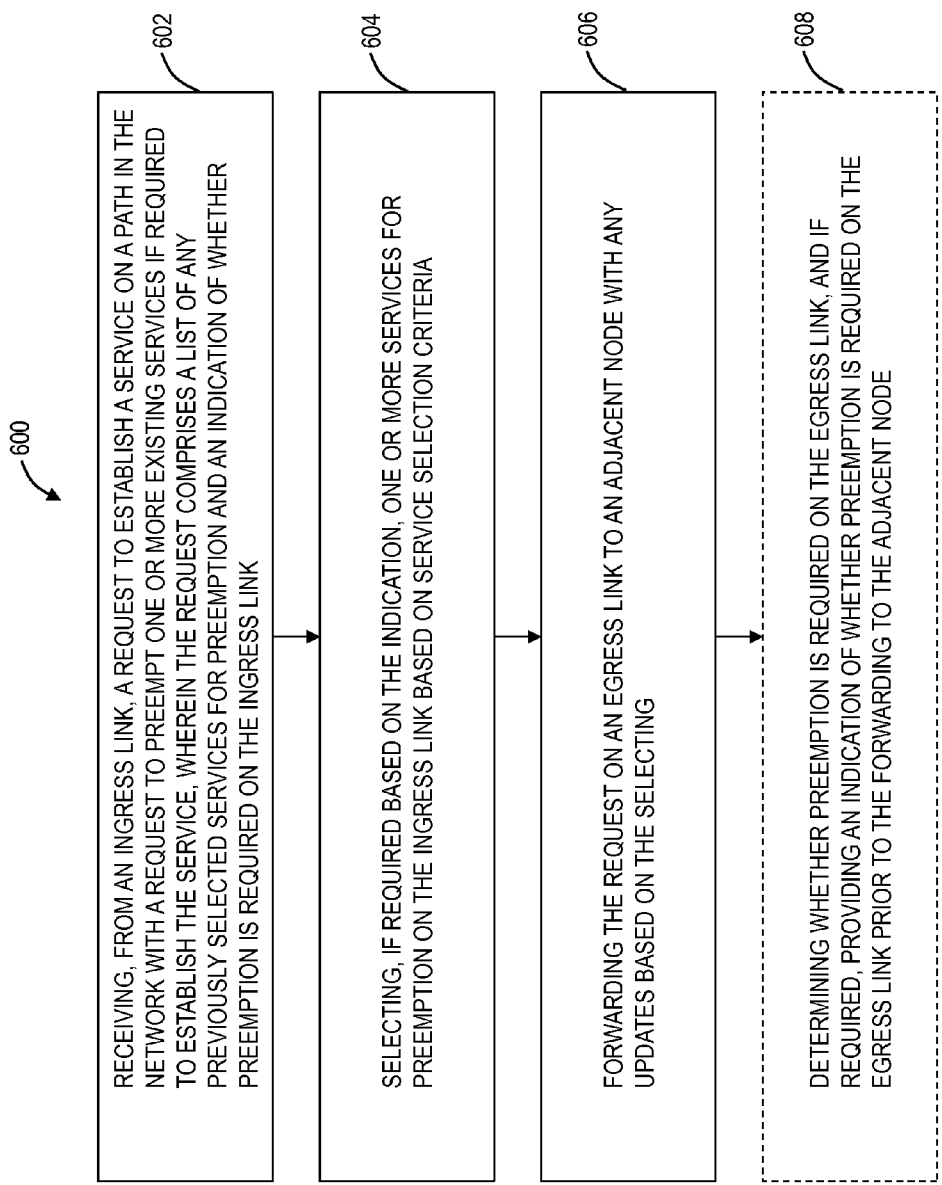

SERVICE PREEMPTION SELECTION SYSTEMS AND METHODS IN NETWORKS

FIELD OF THE DISCLOSURE

The present disclosure generally relates to networking systems and methods. More particularly, the present disclosure relates to service preemption selection systems and methods in networks.

BACKGROUND OF THE DISCLOSURE

Optical networks and the like (e.g., Dense Wave Division Multiplexing (DWDM), Synchronous Optical Network (SONET), Synchronous Digital Hierarchy (SDH), Optical Transport Network (OTN), Ethernet, and the like) at various layers are deploying control plane systems and methods. Control planes provide an automatic allocation of network resources in an end-to-end manner. Exemplary control planes may include Automatically Switched Optical Network (ASON) as defined in ITU-T G.8080/Y.1304, Architecture for the automatically switched optical network (ASON) (02/2005), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to Private Network-to-Network Interface (PNNI) and Multi-Protocol Label Switching (MPLS); or any other type control plane for controlling network elements at multiple layers, and establishing connections among nodes. Control planes are configured to establish end-to-end signaled connections such as Subnetwork Connections (SNCs) in ASON or OSRP and Label Switched Paths (LSPs) in GMPLS and MPLS. Note, as described herein, SNCs and LSPs can generally be referred to as services in the control plane. Also, note the aforementioned control planes are circuit-based control planes, e.g., operating at Layer 1 (Time Division Multiplexing (TDM)) and/or Layer 0 (wavelengths). Control planes use the available paths to route the services and program the underlying hardware accordingly.

Preemption is a process in a network where existing services are dropped or rerouted due to a lack of bandwidth for higher priority services. For example, preemption can occur when there is a fault, and higher priority services need to restore on a link, but the link has insufficient bandwidth. The preempted services can also attempt to restore. Thus, the preemption of one or more established SNCs or other services by another SNC in a control plane network causes increased instabilities as the preempted SNCs attempt to restore. Thus, it would be advantageous to limit the number of services affected by preemption. However, in a distributed control plane with a limited network view, such as GMPLS or ASON, network elements do not have visibility of all service paths in the network. While the originating (or source) network element can choose the lowest cost path for the service based on the knowledge of available bandwidth at a particular priority level on individual links, it does not have knowledge of the other services on those links; only the intermediate network elements know this information (intermediate network elements can also be referred to as transit network elements). Therefore, the originating network element cannot choose which services are preempted on individual links across the network.

Generally, the preemption process includes a SETUP message (in ASON, OSRP, etc.) or some other type of message, notification, etc. transmitted along the path of the service. The intermediate network elements choose one or more services on the link to preempt based on priority, rate, etc., but all based on the local knowledge of the services on the link. Service paths are not taken into account since this information is not available at the originating network element or locally on the intermediate network elements. Thus, if SNC A is preempted on the first link, SNC B may be preempted on the second link causing multiple SNCs to mesh restore. Whereas a more intelligent design maybe only SNC A released on both links. The preempting SETUP Message must be sent without the knowledge of how much instability the action will cause. The decision of which services to preempt must be made by the intermediate network elements. These intermediate network elements have no knowledge of service paths other than the two links in the preempting service's path connected to that network element. Similar to the originating network element, the decision of which services to preempt on these links may not be optimal due to this lack of network visibility.

Software Defined Networking (SDN) utilizes a centralized controller and may have a better view of the network allowing for more informed decisions about the preemption path and services to preempt. However, the level of knowledge may not be complete or may be inaccurate; especially in the case of a hybrid control plane which includes a distributed control plane overseen by a centralized controller where the network elements are given some level of control when restoring services. In the hybrid case, this occurs in two possible scenarios. First, if the network does not advertise services on individual lines within an aggregated link, the centralized controller cannot efficiently choose services to preempt on individual links. This is because it cannot know which lines within the link the preempting service will be assigned. This decision is made locally by the network elements. Second, if the network elements are allowed to perform route calculation during mesh restoration, the centralized controller may not immediately know where the services are routed in the network. This can occur if one or more originating network elements exhaust all protect routes provided by the centralized controller for one or more SNC's.

In circuit-based control planes, SDN, and hybrid control plane networks, it would be advantageous for optimized service preemption selection systems and methods that minimize the impact to other services during preemption.

BRIEF SUMMARY OF THE DISCLOSURE

In an exemplary embodiment, a method of service preemption selection implemented by a node in a network includes receiving, from an ingress link, a request to establish a service on a path in the network while preempting one or more existing services if required to establish the service, wherein the request includes a list of any previously selected services for preemption and an indication of whether preemption is required on the ingress link; selecting, if required based on the indication, one or more services for preemption on the ingress link based on service selection criteria; and forwarding the request on an egress link to an adjacent node with any updates based on the selecting. The selecting can be performed with the list including a backward view of the previously selected services for preemption and a limited forward view where the node performs the selecting based in part on the egress link. The method can further include determining whether preemption is required on the egress link, and if required, providing an indication of whether preemption is required on the egress link during the forwarding to the adjacent node. The updates can include addition of the one or more services for preemption in the request. The service selection criteria can be a hierarchical approach for determining the one or more services for preemption based first on the list, second on a common path between the ingress link and the egress link, and third based on characteristics of the one or more services for preemption. The network can utilize one of (i) a distributed control plane and (ii) a hybrid control mode with both a control plane and a Software Defined Networking (SDN) controller. The network can utilize a hybrid control mode with both a control plane and a Software Defined Networking (SDN) controller, and wherein the SDN controller provides suggestions for the selecting in the request. The node and each intermediate node in the network for the service can be configured to perform the selecting, and wherein the list is utilized to select previously selected services to minimize disruption in the network.

In another exemplary embodiment, a node in a network configured to perform service preemption selection includes a first port coupled to an ingress link, wherein the first port is configured to receive a request to establish a service on a path in the network while preempting one or more existing services if required to establish the service, wherein the request includes a list of any previously selected services for preemption and an indication of whether preemption is required on the ingress link; a controller configured to select, if required based on the indication, one or more services for preemption on the ingress link based on service selection criteria; and a second port configured to forward the request on an egress link to an adjacent node with any updates based on the one or more services for preemption. The one or more services for preemption can be selected with the list including a backward view of the previously selected services for preemption and a limited forward view where the node performs the selecting based in part on the egress link. The controller can be further configured to determine whether preemption is required on the egress link, and if required, providing an indication of whether preemption is required on the egress link when the second port forwards the request on the egress link. The updates can include addition of the one or more services for preemption in the request. The service selection criteria can be a hierarchical approach for determining the one or more services for preemption based first on the list, second on a common path between the ingress link and the egress link, and third based on characteristics of the one or more services for preemption. The network can utilize one of (i) a distributed control plane and (ii) a hybrid control mode with both a control plane and a Software Defined Networking (SDN) controller. The network can utilize a hybrid control mode with both a control plane and a Software Defined Networking (SDN) controller, and wherein the SDN controller provides suggestions for how the controller selects the one or more services for preemption. The node and each intermediate node in the network for the service can be configured to perform the preemption, and wherein the list is utilized to select previously selected services to minimize disruption in the network.

In a further exemplary embodiment, a network configured to perform service preemption selection by one or more nodes includes a plurality of nodes interconnected to one another by a plurality of links; wherein an intermediate node is configured to receive, from an ingress link, a request to establish a service on a path in the network while preempting one or more existing services if required to establish the service, wherein the request includes a list of any previously selected services for preemption and an indication of whether preemption is required on the ingress link, select, if required based on the indication, one or more services for preemption on the ingress link based on service selection criteria, and forward the request on an egress link to an adjacent node with any updates based on the selecting. The one or more services for preemption can be selected with the list including a backward view of the previously selected services for preemption and a limited forward view where the intermediate node performs the selecting based in part on the egress link. The intermediate node can be configured to determine whether preemption is required on the egress link, and if required, provide an indication of whether preemption is required on the egress link when forwarding to the adjacent node and an indication of any service preempted on the ingress link. The network can utilize one of (i) a distributed control plane and (ii) a hybrid control mode with both a control plane and a Software Defined Networking (SDN) controller.

BRIEF DESCRIPTION OF THE DRAWINGS

The present disclosure is illustrated and described herein with reference to the various drawings, in which like reference numbers are used to denote like system components/method steps, as appropriate, and in which:

FIG. 17 is a flowchart of a process of service preemption selection implemented by a node in a network.

DETAILED DESCRIPTION OF THE DISCLOSURE

In various exemplary embodiments, service preemption selection systems and methods are described for circuit-based control planes, SDN, and hybrid control plane networks. The systems and methods provide an ability to look backward and forward to more intelligently choose services to preempt on the local link, thereby reducing the number of services preempted. Again, the systems and methods could be applied to both network level control planes such as ASON, GMPLS, etc. with local knowledge, and to SDN controller based systems to choose services to preempt based on the overriding criteria of reducing network instability.

Exemplary Network

Figure 1A:
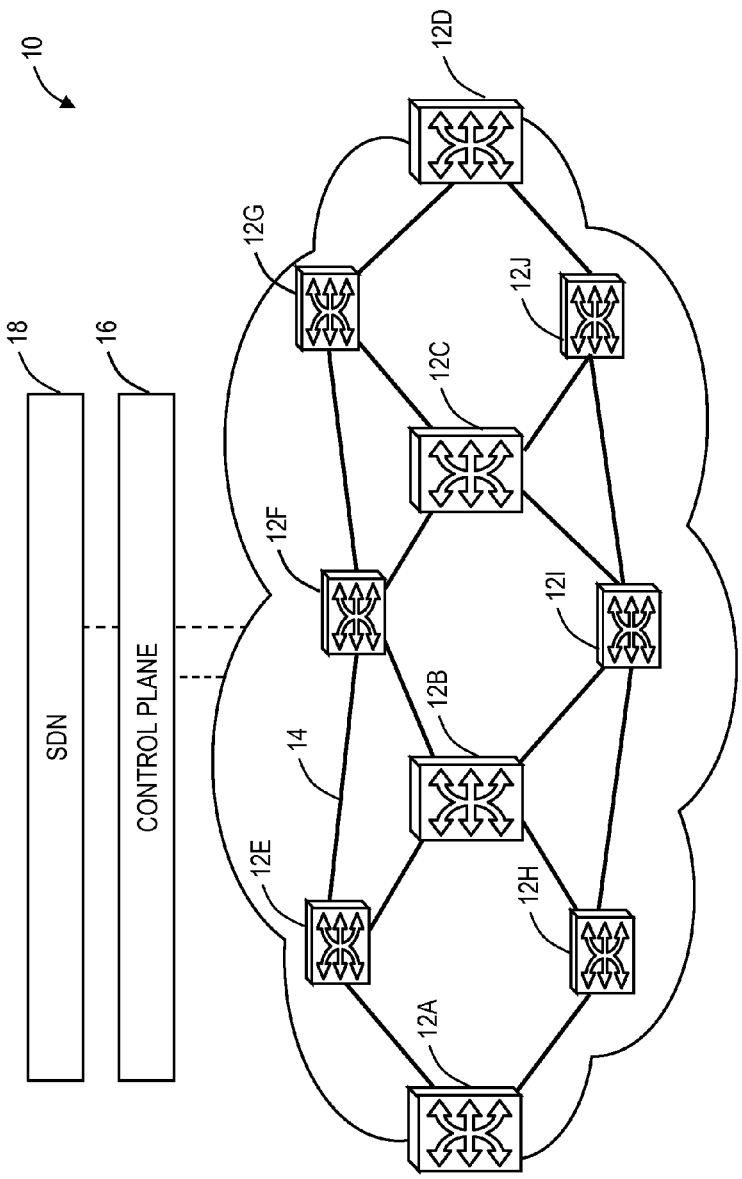
FIG. 1A is a network diagram of an exemplary network with various interconnected nodes.
Figure 15:
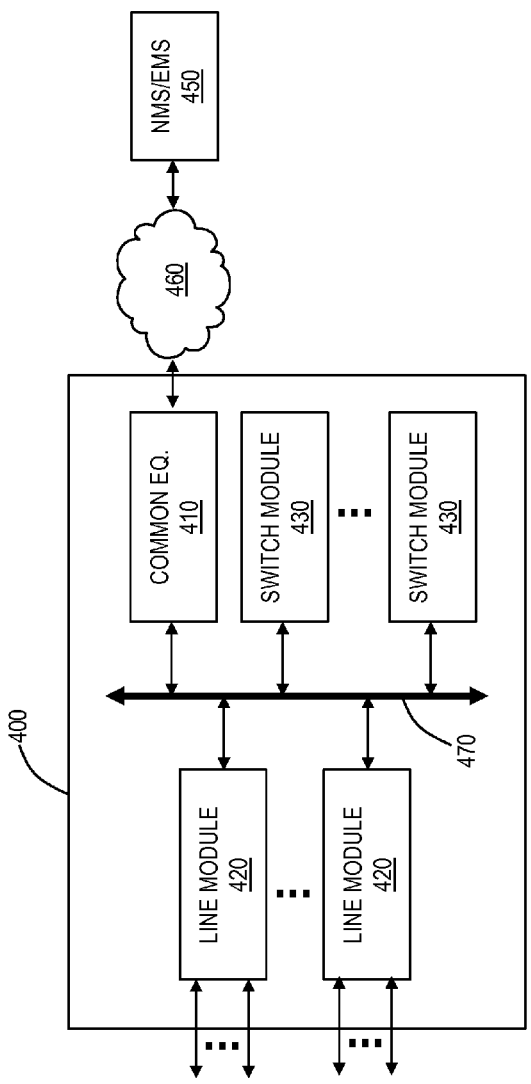
FIG. 15 is a block diagram of an exemplary node for use with the systems and methods described herein.

Referring to FIG. 1A, in an exemplary embodiment, a network diagram illustrates an exemplary network 10 with various interconnected nodes 12 (illustrated as nodes 12A-12J). The nodes 12 are interconnected through a plurality of links 14. The nodes 12 communicate with one another over the links 14 through Layer 0 (L0), Layer 1 (L1), Layer 2 (L2), and/or Layer 3 (L3) protocols. The nodes 12 can be network elements which include a plurality of ingress and egress ports forming the links 12. An exemplary node implementation is illustrated in FIG. 15. The network 10 can include various services between the nodes 12. Each service can be at any of the L0, L1, L2, and/or L3 protocols, such as a wavelength, an SNC, an LSP, etc., and each service is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc.

The network 100 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for connections; network level protection and restoration; and the like. In an exemplary embodiment, the control plane 16 can utilize ASON, GMPLS, OSRP, MPLS, Open Shortest Path First (OSPF), Intermediate System-Intermediate System (IS-IS), or the like. Those of ordinary skill in the art will recognize the network 10 and the control plane 16 can utilize any type of control plane for controlling the nodes 12 and establishing connections between the nodes 12.

An SDN controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports. Examples of SDN include OpenFlow (www.opennetworking org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

Note, the network 10 can use the control plane 16 separately from the SDN controller 18. Alternatively, the network 10 can use the SDN controller 18 separately from the control plane 16. In another exemplary embodiment, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18.

In the terminology of ASON and OSRP, sub-network connections (SNC) are end-to-end signaled paths since from the point of view of a client signal, each is a single network segment. In GMPLS, the connections are an end-to-end path referred to as LSPs. For example, LSPs for GMPLS are described in draft-ietf-ccamp-gmpls-ospf-g709v3-13, "Traffic Engineering Extensions to OSPF for Generalized MPLS (GMPLS) Control of Evolving G.709 OTN Networks," (Dec. 11, 2013), the contents of which are incorporated by reference herein. In SDN, such as in OpenFlow, services are called "flows." In the various descriptions herein, reference is made to SNCs for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

In an exemplary embodiment, the network 10 can be configured to perform service preemption selection by one or more nodes 12. The network 10 can include a plurality of nodes interconnected to one another by a plurality of links; wherein an intermediate node is configured to receive, from an ingress link, a request to establish a service on a path in the network while preempting one or more existing services if required to establish the service, wherein the request includes a list of any previously selected services for preemption and an indication of whether preemption is required on the ingress link, select, if required based on the indication, one or more services for preemption on the ingress link based on service selection criteria, and forward the request on an egress link to an adjacent node with any updates based on the selecting. The one or more services for preemption can be selected with the list including a backward view of the previously selected services for preemption and a limited forward view where the intermediate node performs the selecting at a far end of the ingress link. The intermediate node can be configured to determine whether preemption is required on the egress link, and if required, provide an indication of whether preemption is required on the egress link prior to forwarding to the adjacent node. The network can utilize one of (i) a distributed control plane and (ii) a hybrid control mode with both a control plane and a Software Defined Networking (SDN) controller.

Preemption Cascading

Figure 1B:
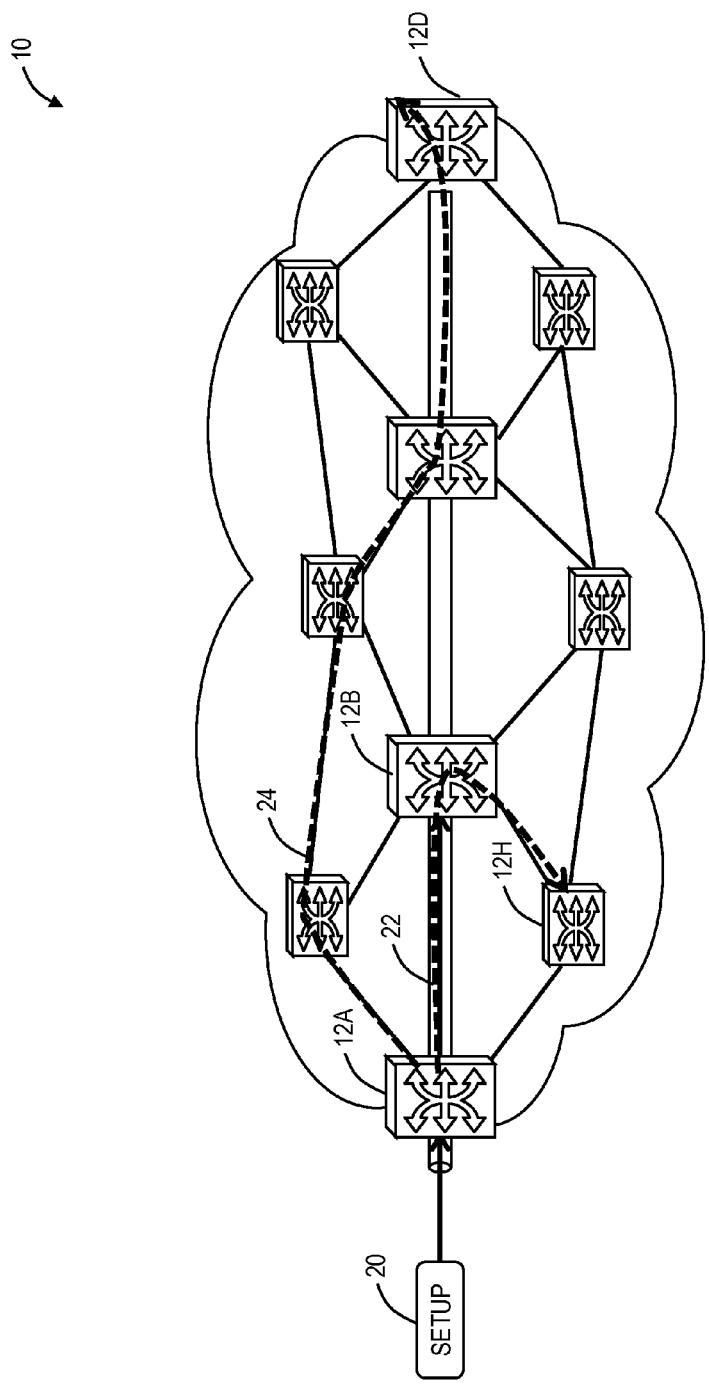
FIGS. 1B-1D are network diagrams of the exemplary network of FIG. 1A illustrating an exemplary preemption operation.
Figure 1C:
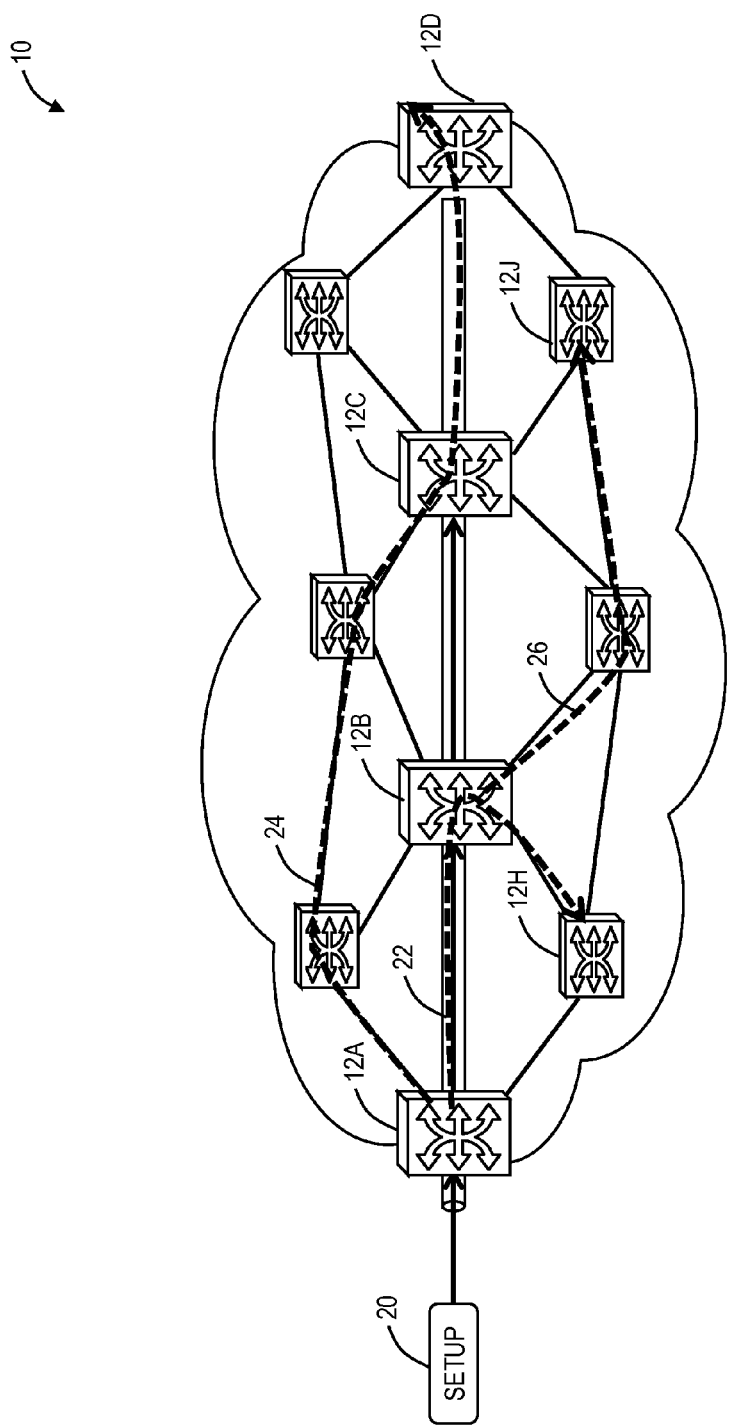
Figure 1D:
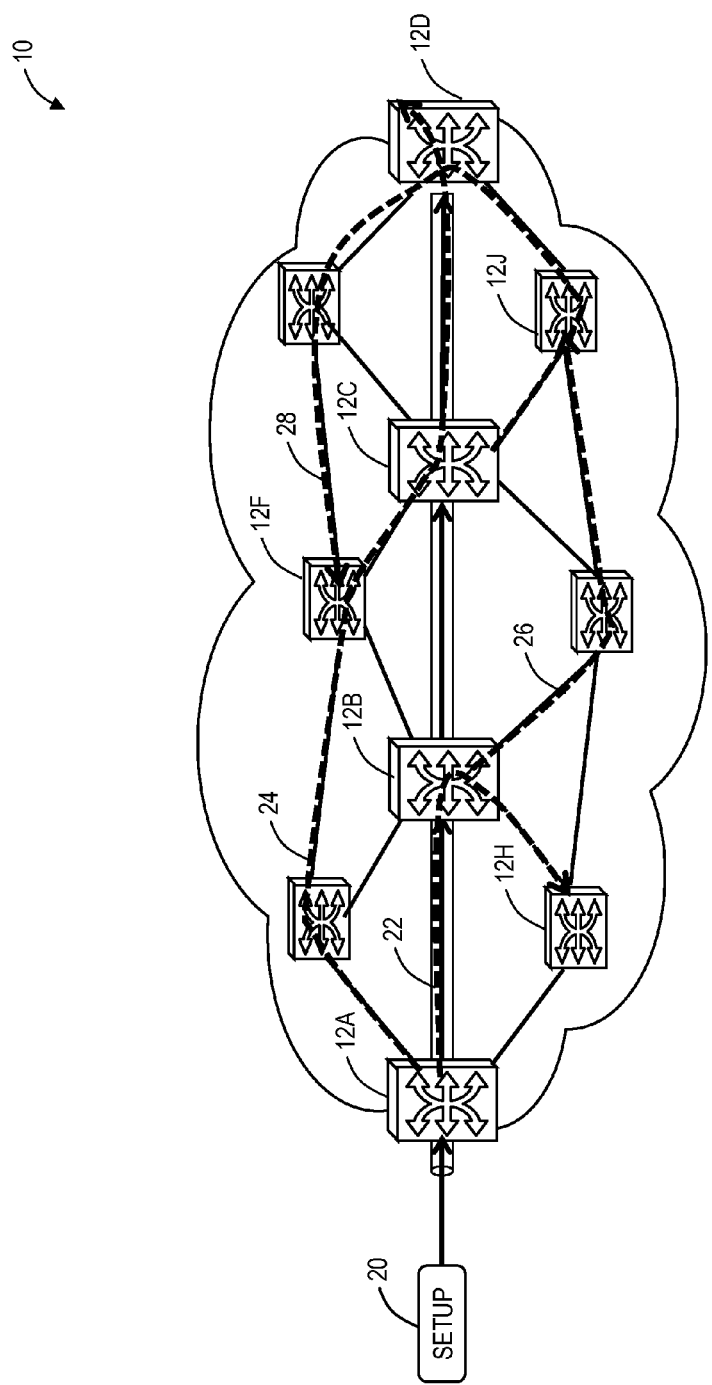

Referring to FIGS. 1B-1D, in various exemplary embodiments, network diagrams illustrate the network 10 and an exemplary preemption operation. In FIG. 1B, a message 20 is to the node 12A which in turn sends the message 20 to the node 12B. The message 20 is a message instructing each node to preempt services to free up bandwidth on local links for higher priority messages. In ASON, OSRP, etc., the message 20 can be a SETUP message. In GMPLS, etc., the message 20 can be a CONNECTION REQUEST, and in SDN, the message 20 can be a message from the SDN controller 18. In FIG. 1B, responsive to the message 20, the node 12A preempts services 22, 24. The service 22 is between the nodes 12A, 12H, and the service 24 is between the nodes 12A, 12D. In FIG. 1C, the message 20 is further forwarded to the node 12C and the node 12B preempts a service 26, which is between the nodes 12B, 12J. Finally in FIG. 1D, the message 20 is further forwarded to the node 12D, and the node 12C preempts a service 28, which is between the nodes 12C, 12F. The preemption causes a cascading effect as lower priority SNCs are preempted, released, and attempt to restore in the network 10. Note, each of the nodes 12A, 12B, 12C is making local decisions, independent of one another and without the visibility of one another. It is desirable to preempt the least number of services while allowing the preempted services to mesh restore. In this manner, the systems and methods seek to maintain the local decisions, but with additional information, from adjacent nodes. The adjacent nodes are from the perspective of the path of the message 20, i.e., the preceding node and the subsequent node.

Again, the preemption of established services causes increased instabilities as the preempted services attempt to restore. Thus, the systems and methods limit the number of services affected by the preempted services. In a distributed control plane with a limited network view such as GMPLS or ASON, the network elements do not have visibility of all services paths in the network. While the originating network element can choose the lowest cost path for a service based on knowledge of available bandwidth at a particular priority level on individual links, it does not have knowledge of the services on those links (to which the originating network element is not adjacent); only the intermediate network elements adjacent to the link know this information. Therefore, conventionally, the originating network element cannot choose which services to preempt on individual links across the network. Conventionally, the message 20 is sent without the knowledge of how much instability the action will cause. The decision of which services to preempt is made by the intermediate network elements. These intermediate network elements have no knowledge of service paths other than the two links in the preempting service path connected to that network element. Similar to the originating network element, the decision of which services to preempt on these links may not be optimal due to this lack of network visibility.

SDN utilizing a centralized controller may have a better view of the network 10 allowing for more informed decisions of the preemption path and the services to preempt. However, the level of knowledge may not be complete or may be inaccurate; especially in the case of hybrid control with a distributed control plane overseen by a centralized controller where the network elements are given some level of control when restoring services.

In various exemplary embodiment, the systems and methods use innovations to choose more intelligently services to preempt on a local link, between two network elements. First, the message received at the two network elements of the local link includes a list of the services already chosen for preemption earlier in the preempting service path. This allows the local network elements to determine if any services present on the local link will already be preempted due to the prior decision in the preempting service setup. This knowledge allows the local link network elements to assign the bandwidth of these services to the preempting service. This allocation may prevent or reduce the number of services needed to be preempted on the local link.

The second innovation allows a limited forward view of the preempting service path. The first network element on the local link indicates the need for preemption on the local link but does not choose the services to preempt. Instead, the decision is made by the second network element on the local link which has visibility of the next link in the preempting service path. If the next link also requires preemption, the second network element can identify common services to both links to preempt, thus reducing the number of services preempted. The second network element then updates the preempted service list in the message 20, and forwards it down the preempting service path where the process is repeated. Thus, these two techniques allow a network element to select services to preempt based on additional knowledge, i.e., the list of previously selected services to preempt and a forward view in that service preemption for any local link is performed by a far end network element.

The systems and methods directly address the distributed control plane and the SDN hybrid control plane cases. In both cases, the originating and intermediate network elements do not have a complete view of the network. In the hybrid case, this occurs in two possible scenarios. First, if the network does not advertise services on individual lines within an aggregated link, the centralized controller cannot efficiently choose the services to preempt on individual links. This is because it cannot know to which lines within the link the preempting services will be assigned. This decision is made locally by the network elements. Second, if the network elements are allowed to perform route calculation during mesh restoration for improved restoration performance, the centralized controller may not immediately know where the services are in the network. This can occur if the originating network element exhausts all protect routes provided by the centralized controller.

A third innovation is described to address the SDN hybrid case. While the centralized controller may not have a complete view of the network, it does have a much better view of than the originating network element; by having knowledge of the services on each link. Using this knowledge, it can prioritize services to be preempted on a link by giving weight to services with along the preempting service path. The list of services to prioritize for preemption can be included in the message 20 and allow network elements to make a more informed decision.

Service Preemption Signal Flow Process

Figure 2:
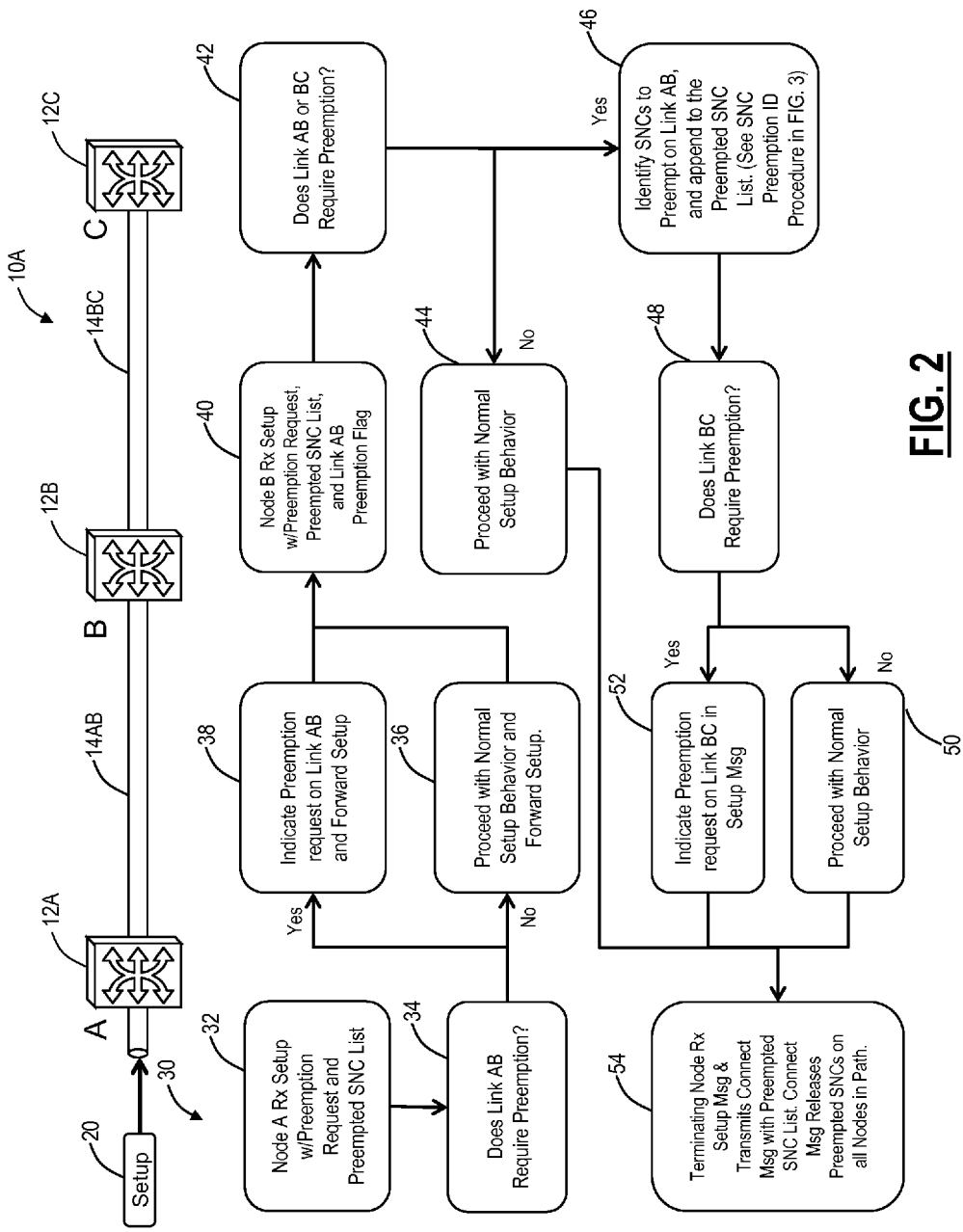
FIG. 2 is a flowchart of a service preemption identification process.

Referring to FIG. 2, in an exemplary embodiment, a flowchart illustrates a service preemption signal flow process 30. The service preemption signal flow process 30 is illustrated with reference to a network 10A including nodes 12A, 12B, 12C, interconnected by links 14AB, 14BC. The service preemption path is from the node 12A to the node 12B to the node 12C. Also, for illustration purposes, the service preemption signal flow process 30 is illustrated with reference to ASON/OSRP with the message 20 as a SETUP message and the services as SNCs. The message 20 is transmitted to the node 12A which receives the SETUP message with a preemption request and a preempted SNC list (step 32). The preemption request is to cause preemption to free up bandwidth on the local link 14AB, and the preempted SNC list includes a view of what SNCs previous nodes 12 have selected. Note, the SETUP message can include both a request for a new SNC and a request to preempt other SNCs for the new SNC.

The node 12A determines if the link 14AB requires preemption (step 34). This is determine based on the bandwidth required in the preemption request and the current bandwidth on the link 14AB. If the link 14AB does not require preemption, the node 12A proceeds with normal SETUP behavior, for the new SNC, and forwards the SETUP message to the node 12B (step 36). If the link 14AB needs preemption, e.g., to support the new SNC, the node 12A indicates a preemption request on the link 14AB, in the SETUP message, and forwards the SETUP message to the node 12B (step 38).

The node 12B receives the SETUP message from the node 12A with the preemption request, the preempted SNC list, and a preemption flag for the link 14AB (step 40). The preemption flag was set in the steps 36, 38 by the node 12A, and the preemption flag determines whether or not the link 14AB or the link 14BC requires preemption (step 42). If the link 14AB does not need preemption, the node 12B proceeds with normal SETUP behavior (step 44). If the link 14AB needs preemption, the node 12B identifies the SNCs to preempt on the link 14AB and appends the identified SNCs to the preempted SNC list (step 46). Note, identification of the SNCs for preemption is further described in FIG. 3.

The node 12B next determines if the link 14BC requires preemption (step 48). If the link 14BC does not require preemption, the node 14B proceeds with normal SETUP behavior (step 50). If the link 14BC requires preemption, the node 14B indicates a preemption request on the link 14BC in the SETUP message (step 52). The node 12B forwards the SETUP message with the updated preempted SNC list and with or without the preemption flag for the link 14BC. The node 12C, which is the terminating node, receives the SETUP message and transmits a CONNECT message with the preempted SNC list. The CONNECT message is sent towards the node 12A, and it releases the preempted SNCs on all nodes 12A, 12B, 12C in the path (step 54).

Service Preemption Identification Process

Figure 3:
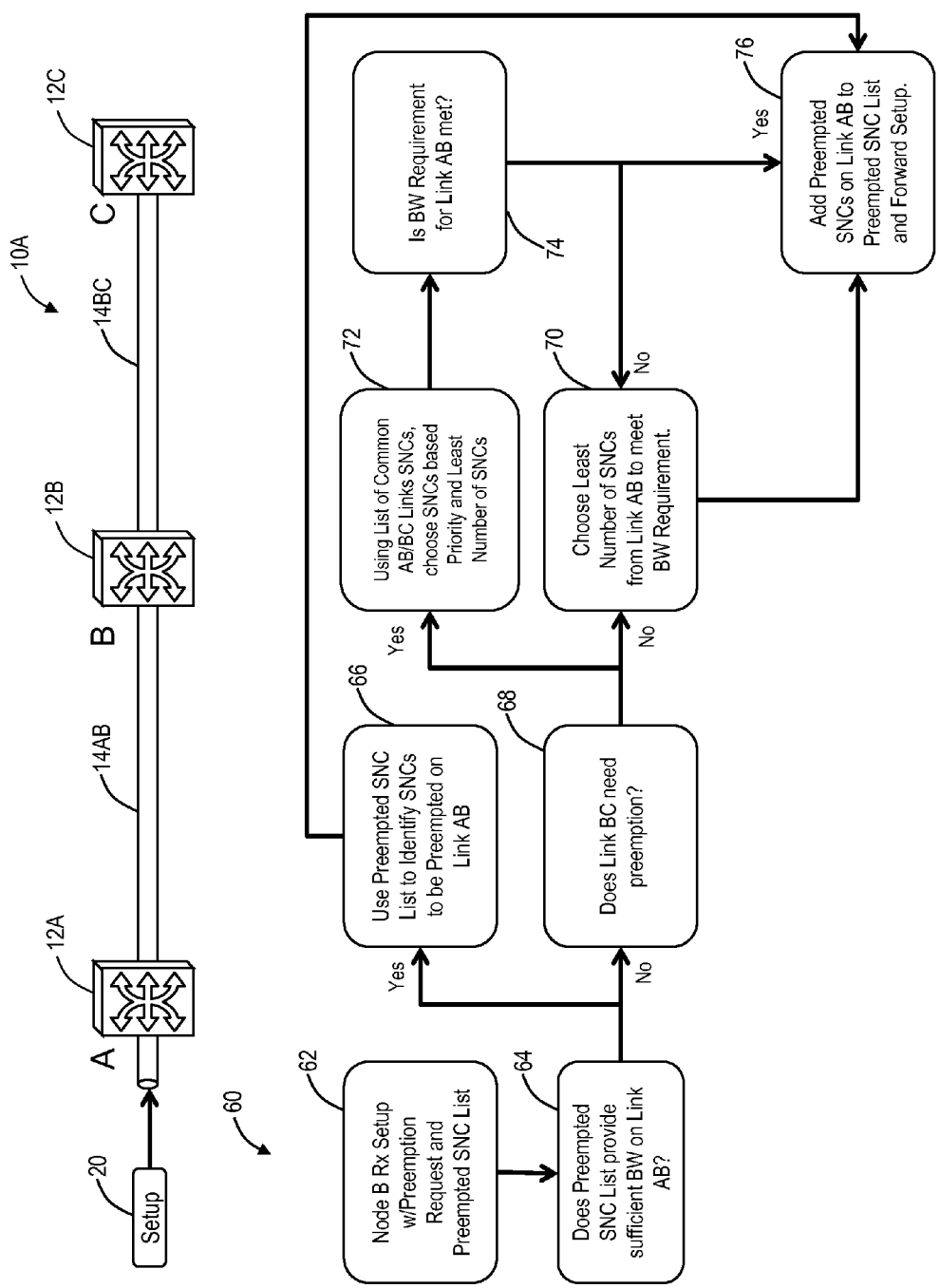
FIG. 3 is a flowchart of a service preemption identification process.

Referring to FIG. 3, in an exemplary embodiment, a flowchart illustrates a service preemption identification process 60. The service preemption identification process 60 is illustrated with reference to a network 10A including nodes 12A, 12B, 12C. The service preemption path is from the node 12A to the node 12B to the node 12C. The service preemption identification process 60 can operate with the service preemption signal flow process 30. The service preemption identification process 60 assumes there is a need for preemption on the link 14AB. Continuing from step 40, the node 12B receives the SETUP message with the preemption request and the preempted SNC list (step 62). The node 12B checks to see if the preempted SNC list provides sufficient bandwidth on the link 14AB based on the preemption request (step 64). If the preempted SNC list provides sufficient bandwidth, the node 12B uses the preempted SNC list to identify the SNCs to be preempted on the link 14AB (step 66). Here, the node 12B selects SNCs to preempt on the link 14AB based on SNCs that have already been selected by previous nodes.

If the preempted SNC list does not provide sufficient bandwidth, the node 12B determines in the link 14BC needs preemption (step 68). If the link 14BC does not need preemption, the node 12B chooses the least number of SNCs from the link 14AB to meet the bandwidth requirements (step 70). Here, since there is no forward requirement for preemption on the link 14BC and because the previously preempted SNCs do not affect the link 14AB, the node 12B can choose what SNCs to preempt on the link 14AB based solely on information associated with the link 14AB. If the link 14BC also needs preemption, the node 12B uses a list of common SNCs for the links 14AB, 14BC to choose the SNCs for preemption based on priority and a least number of SNCs (step 72). Here, the previously preempted SNCs do not affect the link 14AB, but there is also a need for preemption on the link 14BC, accordingly, the node 12B can choose common SNCs between the links 14AB, 14BC to minimize the number of overall SNCs preempted.

After step 72, the node 12B determines if the bandwidth requirement is met for the link 14AB, based on the preemption of common SNCs between the links 14AB, 14BC (step 74). If not, the node 12B goes to step 70. If the bandwidth requirement is met and after step 66, the node 12B adds the preempted SNCs in the preempted SNC list and forwards the SETUP message forward (step 76).

The nodes 12A, 12B, 12C can choose which services to preempt based on a hierarchical approach which has criteria for optimally selecting the services. For example, the service selection criteria can include:

1. SNC in SETUP Message Preempted List (i.e., already preempted)
2. SNC sharing common path with Preempting SNC Downstream
3. SNC with Lowest Priority
4. SNC with Lowest Rate/Number of SNCs (i.e., Total Rate)
5. SNC with Lowest Incarnation Number The criteria select SNCs (services) intelligently to minimize the number of affected services in preemption. By first selecting SNCs which have already been selected by downstream nodes, the criteria avoids disrupting SNCs where possible. Second, by selecting SNCs sharing a common part with the preempting SNC downstream, the criteria selects the best SNC to minimize again disrupting SNCs where possible. The first two criteria selects SNCs based on previous decisions (downstream) and based on the common path upstream. These two criteria make the SNC selection not merely a local decision with the expectation of minimization of SNCs where possible. The third through fifth criteria is based solely on local information at the node.

The service preemption signal flow process 30 and the service preemption identification process 60 can operate with a control plane, e.g., a distributed control plane where the originating network element can initiate the message 20 and the intermediate network elements can perform various aspects of the processes 30, 60. In an SDN and control plane hybrid network, the controller may perform the route calculation instead of the originating network element and provide the protection route to the originating network element. In this case, the controller can take into account existing SNCs along the preempting SNCs path. While the controller cannot choose specific SNCs to preempt on individual links, the controller can suggest SNCs to preempt and pass this information to the network elements in the SETUP message. These SNCs should be prioritized in choosing the SNC(s) to preempt by the intermediate network elements.

The SNCs present on the preempted SNC list should be chosen for preemption on the local link since these SNCs can be preempted, and their bandwidth can become available. The SNCs on the first and second links available for preemption can be classified by preemption criteria and ordered into two lists. The preemption criteria may be based on the presence on the priority list provided by the centralized controller, SNC Holding Priority, SNC Size/Rate, and SNC Quantity. Common SNCs to both lists can be chosen for preemption first, with an emphasis of preempting the least number of SNCs to meet the current bandwidth necessary to setup the Preempting SNC. Any additional bandwidth required can need to be chosen from SNCs not common to both links. SNCs chosen for Preemption can be reserved for the specific Preempting SNC, but not released.

When the preempting SNCs SETUP message reaches the terminating network element, the preempted SNC list is transferred to the CONNECT message and returned along the preempting SNCs setup path. The preempted SNC list includes all the decisions made by the intermediate network elements across all links in the path. While the preempted SNCs were identified and reserved during the setup phase, the CONNECT message sent by the terminating network element actually triggers the release of these SNCs. This prevents the unnecessary release of preempted SNCs in the case of a failed setup of the preempting SNC. The terminating network element cannot enhance the preempted SNC list, as it does not have any more information about the links in the path than the originating or intermediate network elements.

Figure 4:
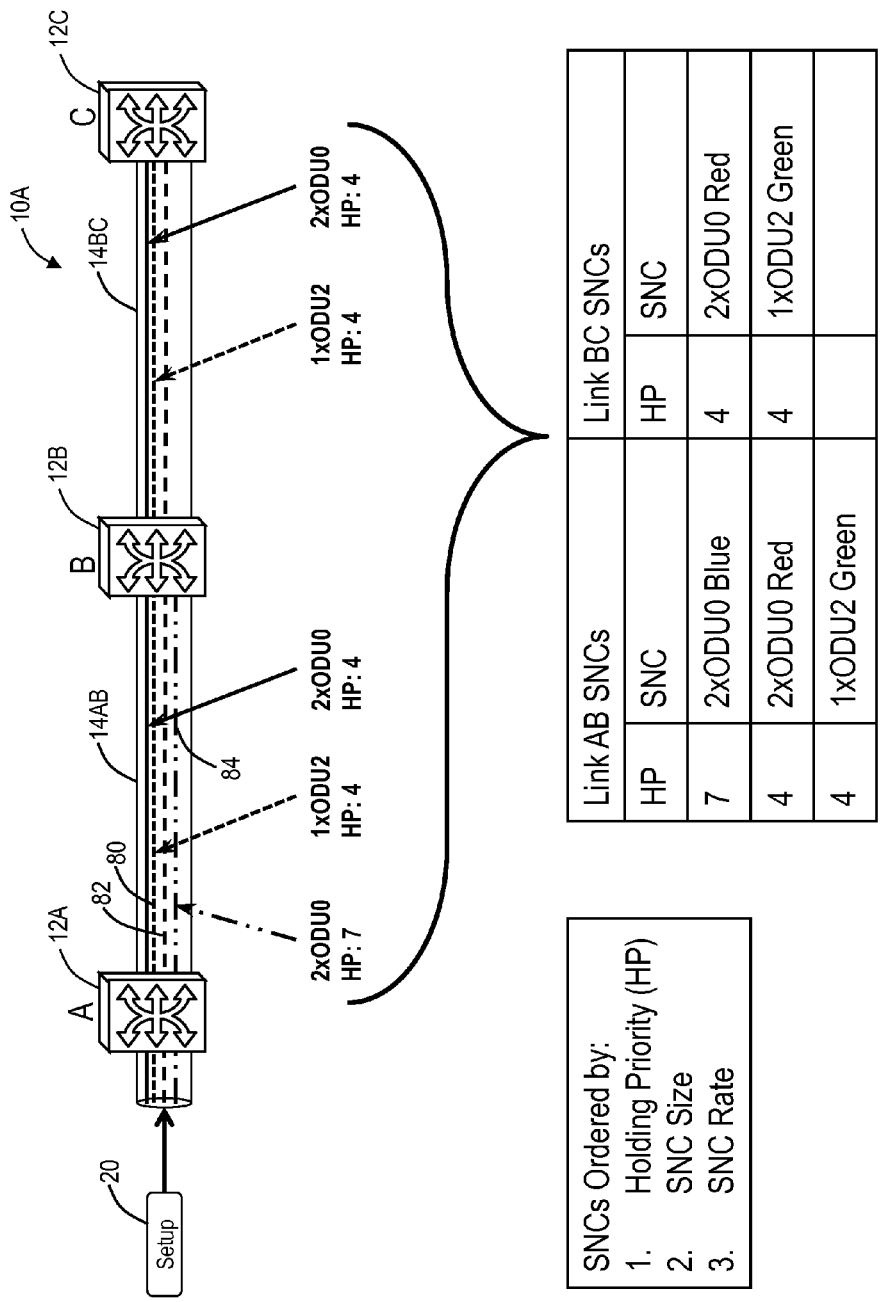
FIG. 4 is a network diagram of a network with various SNCs equipped on the links.

At the node 12B, the link 14AB can be referred to as an ingress link and the link 14BC can be referred to as an egress link. The node 12A is responsible for determining whether or not preemption is required for the link 14AB and to signal such requirement to the node 12B. The node 12B, on the other hand, is responsible for determining which services are preempted on the link 14AB. Conversely, the node 12B is responsible for determining whether or not preemption is required on the link 14BC and to signal such requirement to the node 12C. In addition to the far end node selecting services, the message 20 includes a history of any previously selected services. In this manner, the selection of services for preemption is done forward-looking as well as backward looking Backward looking in that the selecting node has a list of already selected services—which optimally can be selected again to minimize impacted services. Forward-looking in that the selecting node is at the end of the link, not the beginning Preemption Identification Procedure Examples Referring to FIGS. 4-14, in various exemplary embodiments, network diagrams illustrate various examples of preemption identification in the network 10A. FIG. 4 illustrates the network 10A with various SNCs equipped on the links 14AB, 14BC. In these examples, the services are SNCs and the bandwidth is in terms of Optical channel Data Unit k (ODUk) where k=0, 1, 2, or 3. Of course, the network 10A and the preemption selection systems and methods contemplate any services. The SNCs are ordered by Holding Priority (HP), SNC size, and SNC rate. For illustration purposes, the SNCs are referred to as Green, Red, and Blue (SNCs 80, 82, 84, respectively). The link 14AB includes the Blue SNC 84 which is 2xODU0 with an HP of 7, the Red SNC 82 which is 2xODU0 with an HP of 4, and the Green SNC 80 which is 1xODU2 with an HP of 4. The link 14BC includes the Red SNC 82 and the Green SNC 80. Note, for example, the higher the HP in value, the lower the HP is. For example, the Green SNC 80 with an HP of 4 is a higher priority than the Blue SNC 80 with an HP of 7.

Once the SNCs on the two links 14AB, 14BC are ordered, identifying the SNCs to preempt should proceed by choosing the least number of SNCs which meets the bandwidth requirements of both the links 14AB, 14BC without going over. For instance, in the example where the preempting SNC is an ODU2, the node 12B should choose the Green SNC 80 because preempting the ODU0 SNCs will not meet the bandwidth required on the link 14BC even though the Green SNC 80 has a higher Holding Priority.

Figure 5:
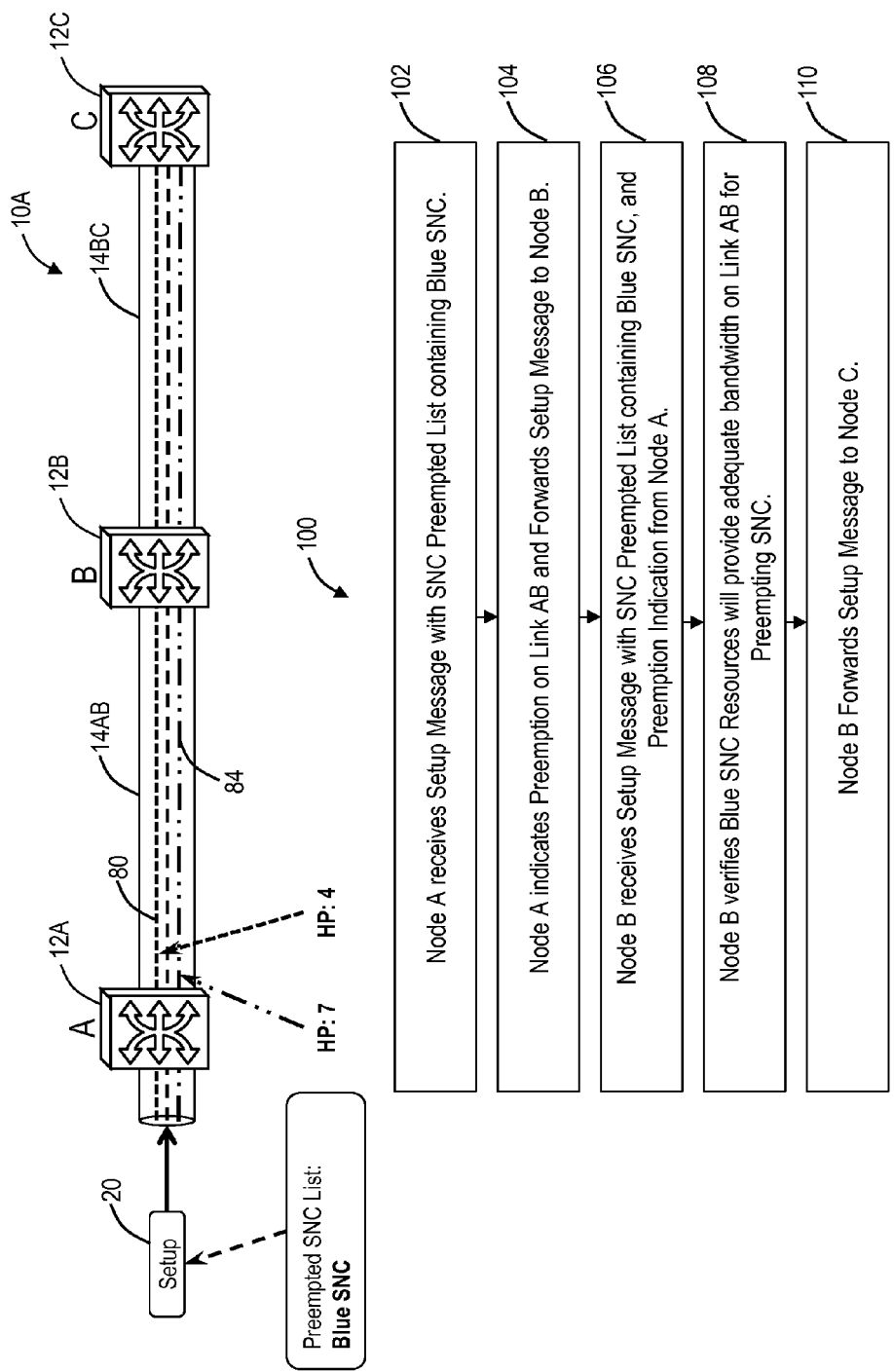
FIG. 5 is a flowchart of a first preemption SNC selection process.

FIG. 5 is a flowchart of a first preemption SNC selection process 100. In the process 100, the message 20 includes a preempted SNC list with the Blue SNC 84. The node 12A receives the SETUP message 20 with the preempted SNC list with the Blue SNC 84 (step 102). The node 12A indicates preemption is required on the link 14AB and forwards the SETUP message 20 to the node 12B (step 104). The node 12B subsequently receives the SETUP message 20 with the preempted SNC list with the Blue SNC 84, and a preemption indication from the node 12A (step 106). The node 12B verifies the Blue SNC 84 resources will provide adequate bandwidth on the link 14AB for the preempting SNC (step 108), and the node 12B forwards the SETUP message 20 to the node 12C (step 110).

Figure 6:
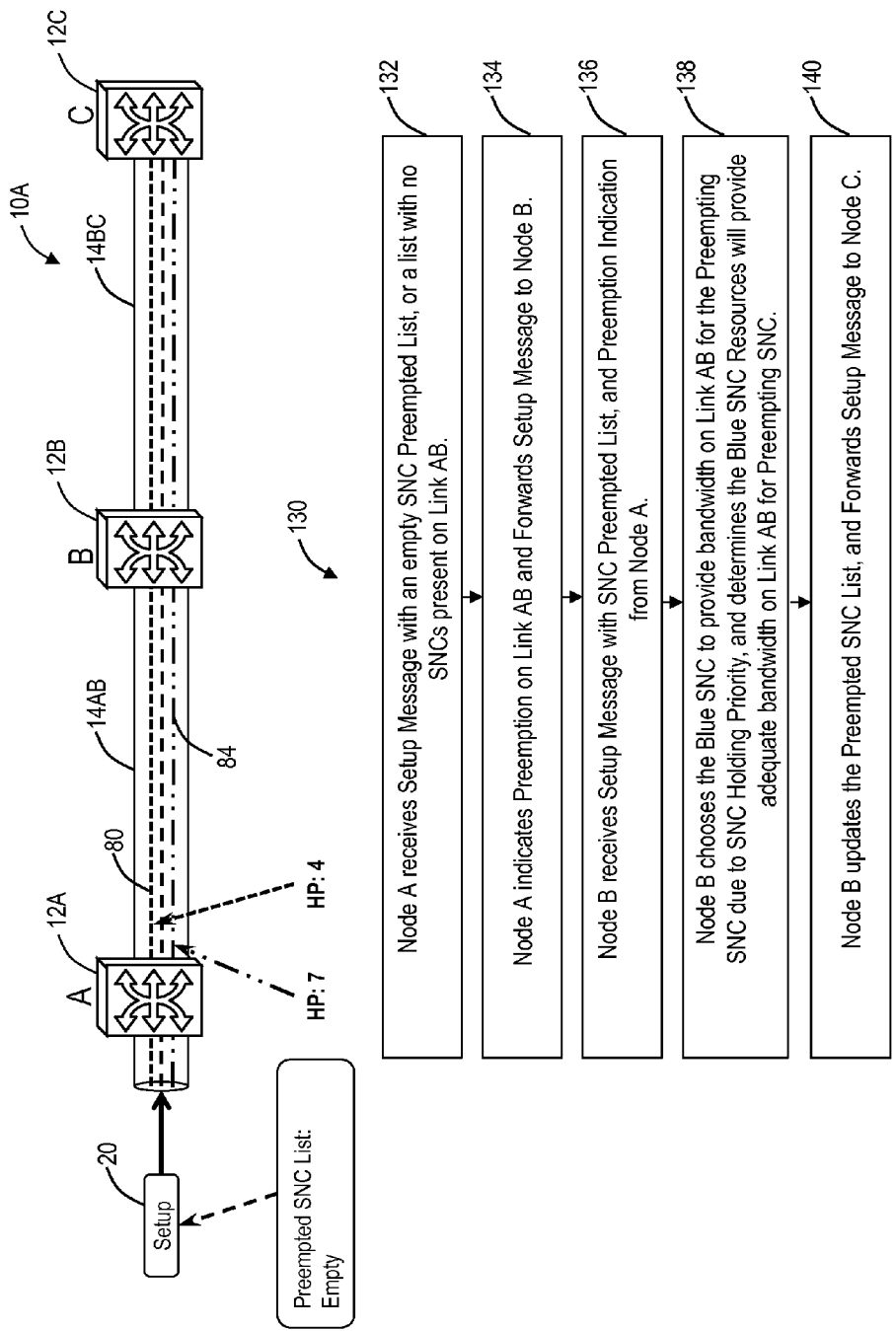
FIG. 6 is a flowchart of a second preemption SNC selection process.

FIG. 6 is a flowchart of a second preemption SNC selection process 130. In the process 130, the message 20 includes an empty preempted SNC list. The node 12A receives the SETUP message 20 with the empty preempted SNC list (step 132). The node 12A indicates preemption on the link 14AB and forwards the SETUP message 20 to the node 12B (step 134). The node 12B receives the SETUP message 20 with the empty preempted SNC list and the preemption indication from the node 12A (step 136). The node 12B chooses the Blue SNC 84 to provide bandwidth on the link 14AB for the preempting SNC due to SNC Holding Priority, and the node 12B determines the Blue SNC 82 resources will provide adequate bandwidth on the link 14AB for the preempting SNC (step 138). The node 12B updates the preempting SNC list and forwards the SETUP message 20 to the node 12C (step 140).

Figure 7:
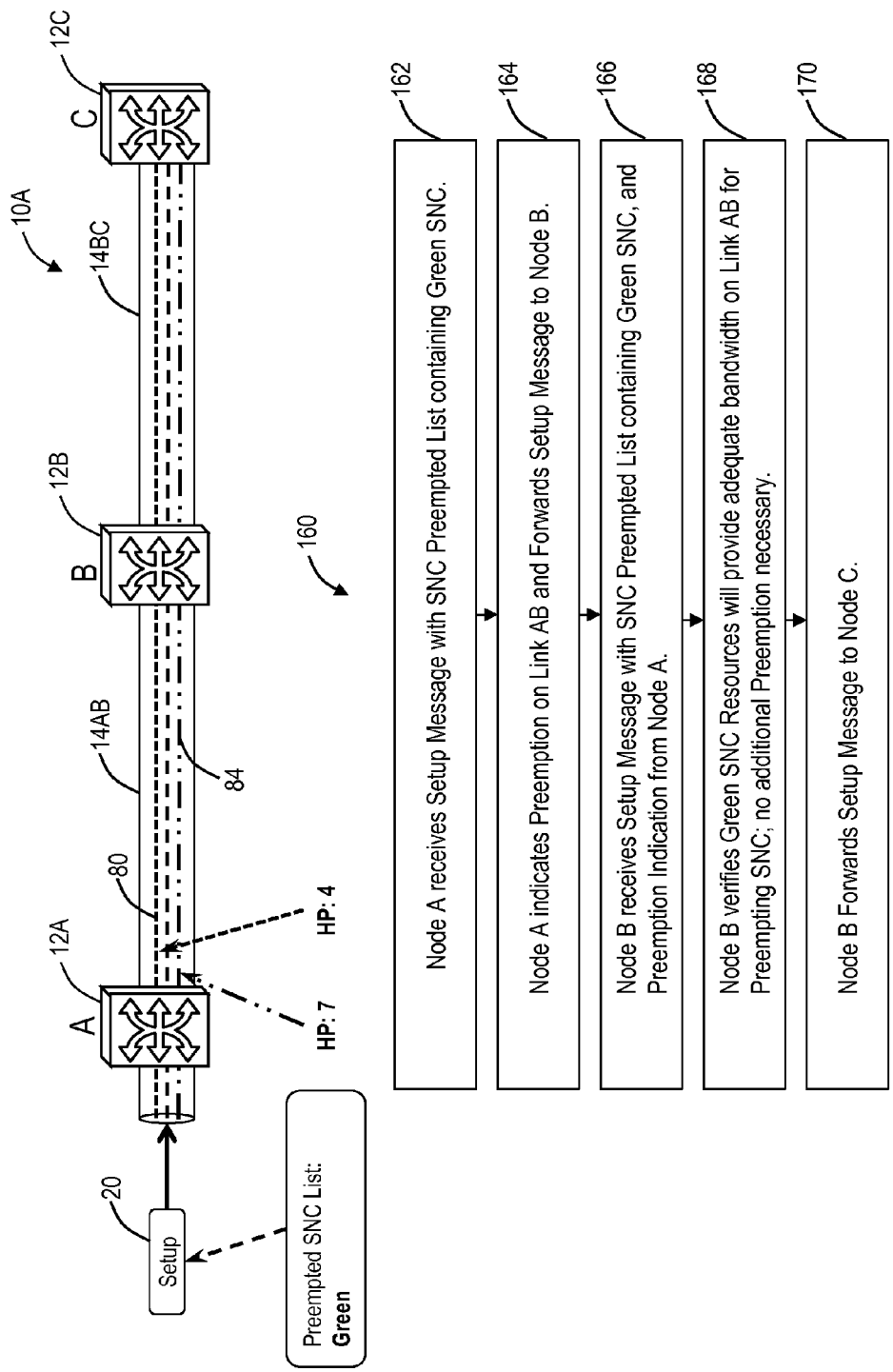
FIG. 7 is a flowchart of a third preemption SNC selection process.

FIG. 7 is a flowchart of a third preemption SNC selection process 160. In the process 160, the message 20 includes the Green SNC 80. The node 12A receives the SETUP message 20 with the SNC preempted list with the Green SNC 80 (step 162). The node 12A indicates preemption on the link 14AB and forwards the SETUP message 20 to the node 12B (step 164). The node 12B receives the SETUP message 20 with the SNC preempted list with the Green SNC 80 and the preemption indication from the node 12A (step 166). The node 12B verifies the Green SNC 80 resources will provide adequate bandwidth on the link 14AB for the preemption SNC, and because this is the case, no additional preemption is necessary (step 168). The node 12B forwards the SETUP message 20 to the node 12C (step 170). The Green SNC 80 resources are used on the link 14AB even though the Blue SNC 84 Holding Priority is lower because the Green SNC 80 is already present on the preempted SNC List.

Figure 8:
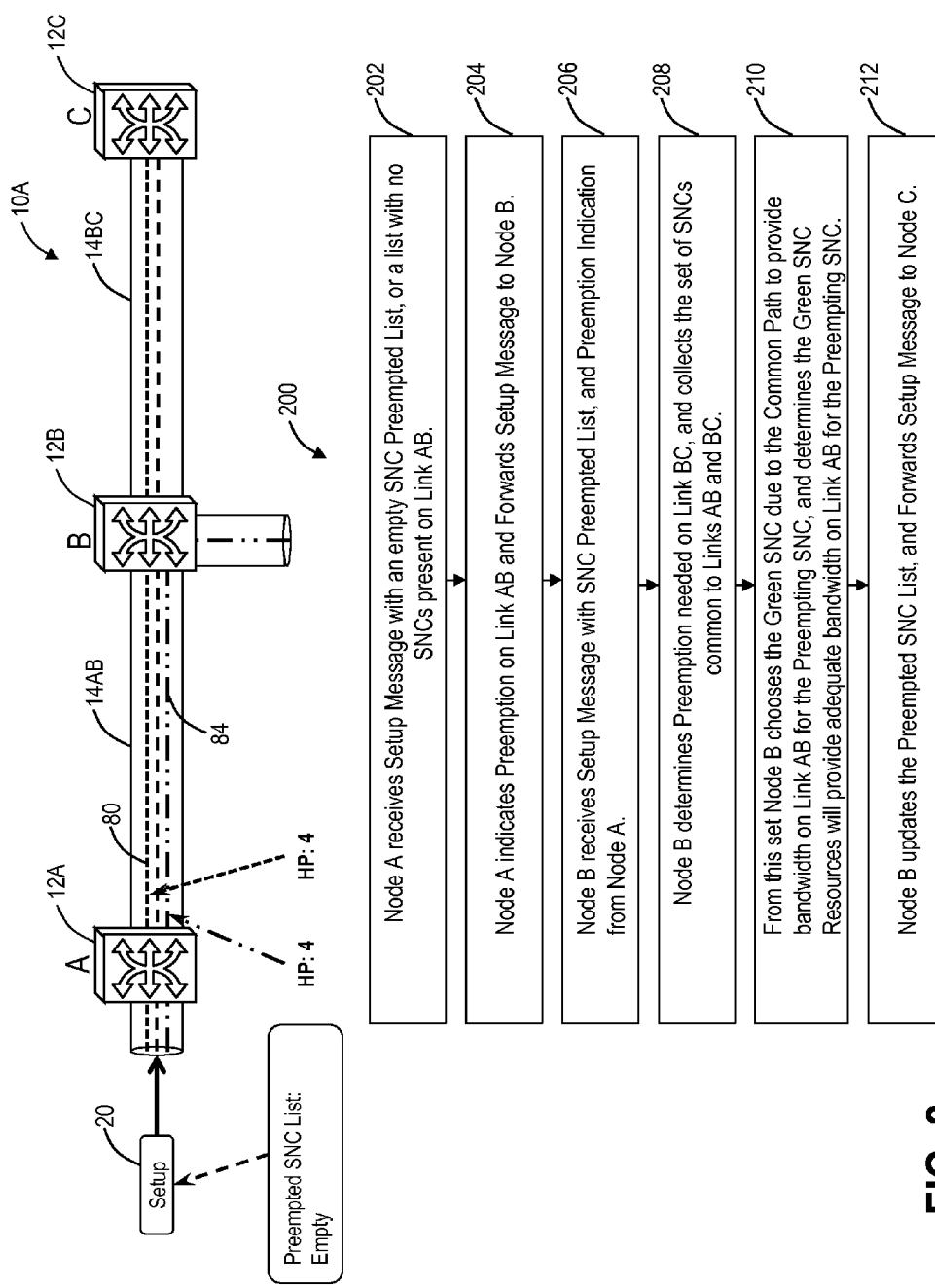
FIG. 8 is a flowchart of a fourth preemption SNC selection process.

FIG. 8 is a flowchart of a fourth preemption SNC selection process 200. In the process 200, the message 20 includes an empty preempted SNC list. The node 12A receives the SETUP message 20 with the empty preempted SNC list or a list with no SNCs present on the link 14AB (step 202). For example, if the preempted SNC list has SNCs included, but none is present on the link 14AB, this would be the equivalent of an empty preempted SNC list. The node 12A indicates preemption on the link 14AB and forwards the SETUP message 20 to the node 12B (step 204). The node 12B receives the SETUP message 20 with the preempted SNC list and the preemption indication from the node 12A (step 206). The node 12B determines preemption is needed on the link 14BC and collects the set of SNCs common to the links 14AB, 1BC (step 208). From this set, the node 12B chooses the Green SNC 80 due to the common path to provide bandwidth on the link 14AB for the preempting SNC, and the node 12B determines the Green SNC 80 resources will provide adequate bandwidth on the link 14AB for the preempting SNC (step 210). The node 12B updates the preempted SNC list and forwards the SETUP message 20 to the node 12C (step 212).

Figure 9:
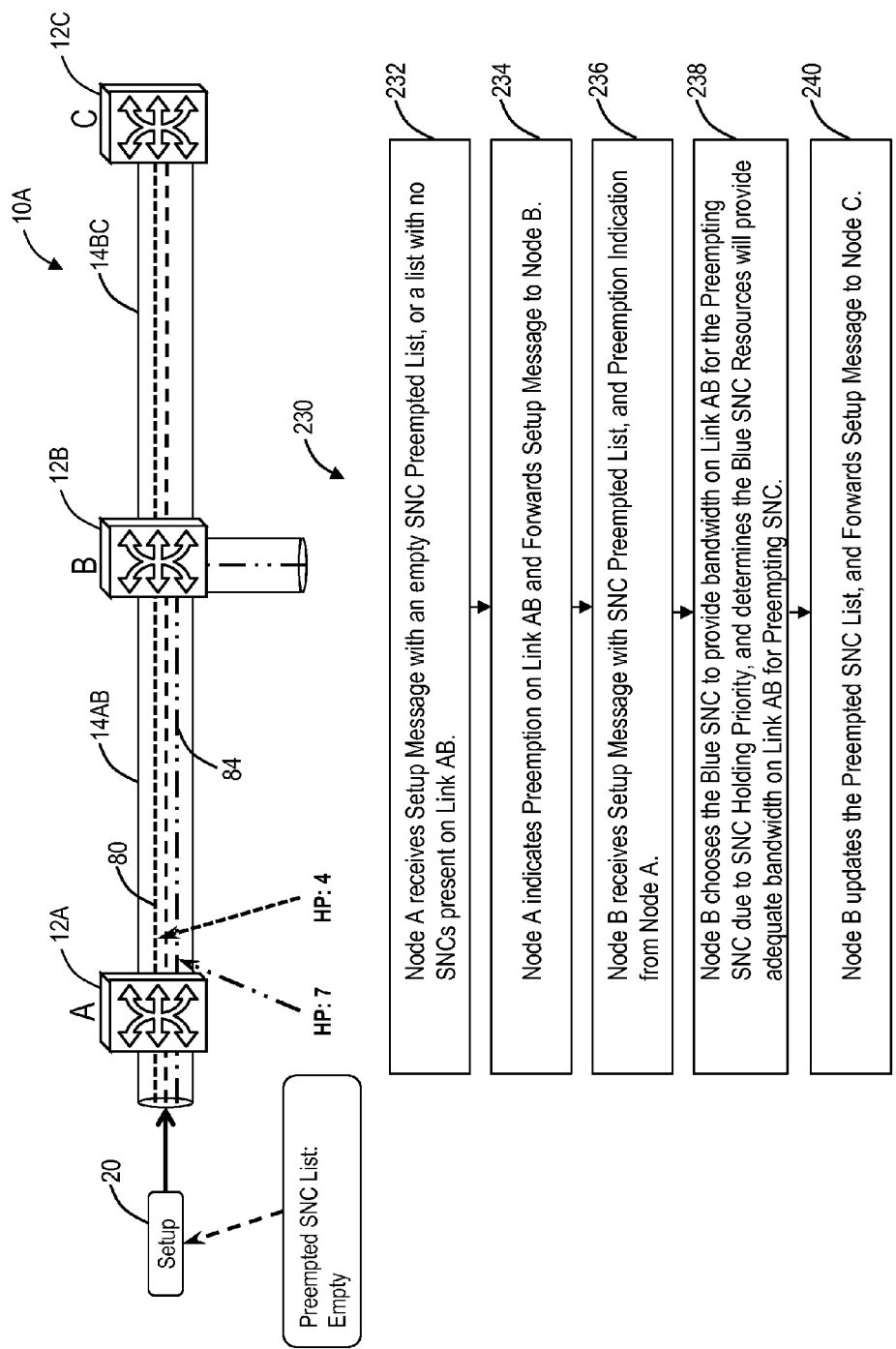
FIG. 9 is a flowchart of a fifth preemption SNC selection process.

FIG. 9 is a flowchart of a fifth preemption SNC selection process 230. In the process 230, the message 20 includes an empty preempted SNC list. The node 12A receives the SETUP message with the empty preempted SNC list or with a list with no SNCs present on the link 14AB (step 232). The node 12A indicates preemption on the link 14AB and forwards the SETUP message 20 to the node 12B (step 234). The node 12B receives the SETUP message 20 with the preempted SNC list and the preemption indication from the node 12A (step 236). The node 12B chooses the Blue SNC 84 to provide bandwidth on the link 14AB for the preempting SNC due to the SNC Holding Priority, and determines the Blue SNC 84 resources will provide adequate bandwidth on the link 14AB for the preempting SNC (step 238). The node 12B updates the preempted SNC list and forwards the SETUP message 20 to the node 12C (step 240).

Figure 10:
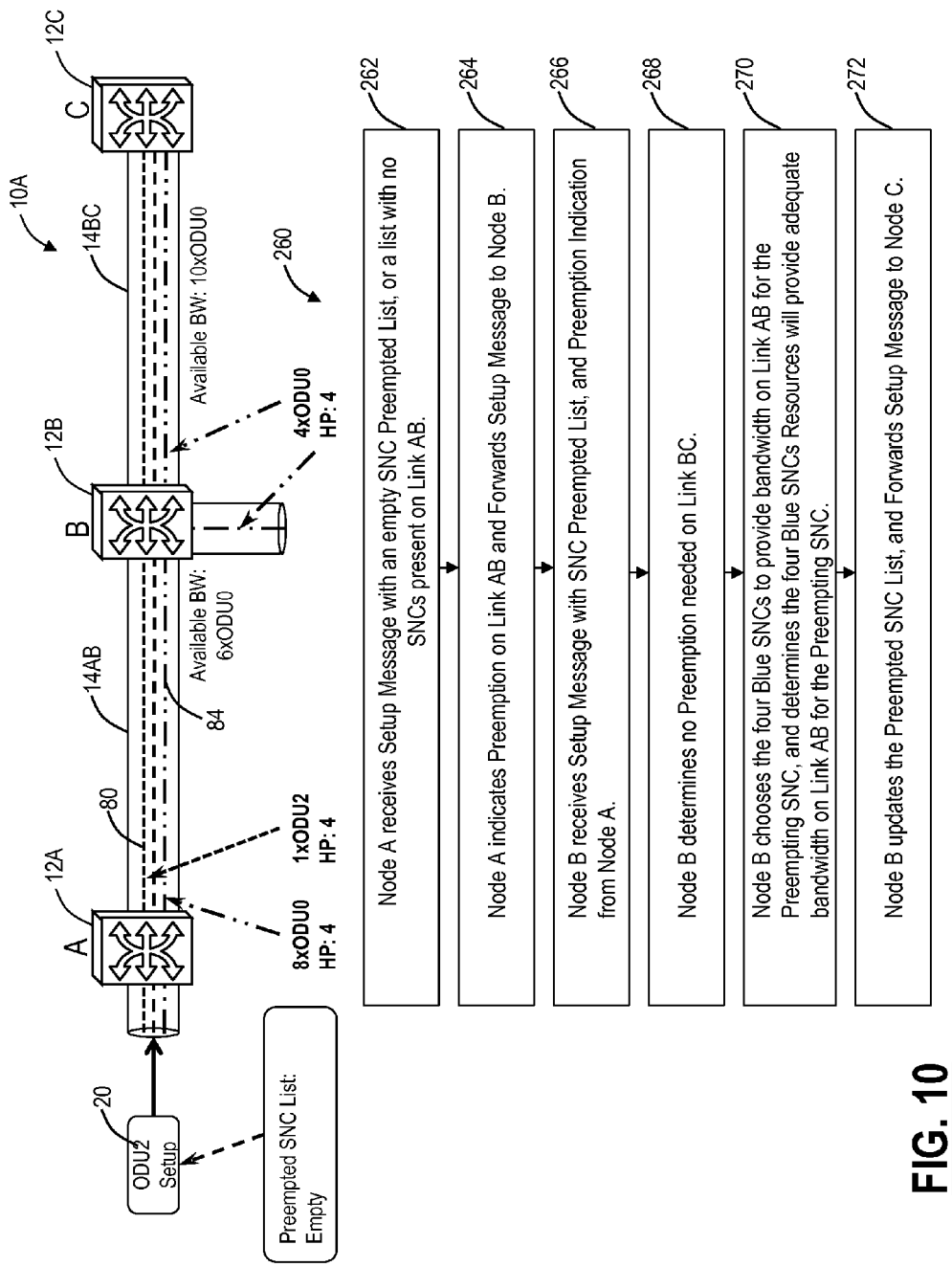
FIG. 10 is a flowchart of a sixth preemption SNC selection process.

FIG. 10 is a flowchart of a sixth preemption SNC selection process 260. In the process 260, the message 20 includes an empty preempted SNC list. Also, in this example, the Blue SNC 84 includes 8xODU0 on the link 14AB and 4xODU0 on the link 14BC. The node 12A receives the SETUP message with the empty preempted SNC list or with a list with no SNCs present on the link 14AB (step 262). The node 12A indicates preemption on the link 14AB and forwards the SETUP message 20 to the node 12B (step 264). The node 12B receives the SETUP message 20 with the preempted SNC list and the preemption indication from the node 12A (step 266). The node 12B determines no preemption is needed on the link 14BC (step 268). The node 12B chooses the 4xODU0 Blue SNCs 84 to provide bandwidth on the link 14AB for the preempting SNC, and determines the 4xODU0 Blue SNCs 84 resources will provide adequate bandwidth on the link 14AB for the preempting SNC (step 270). The node 12B updates the preempted SNC list and forwards the SETUP message 20 to the node 12C (step 272).

Figure 11:
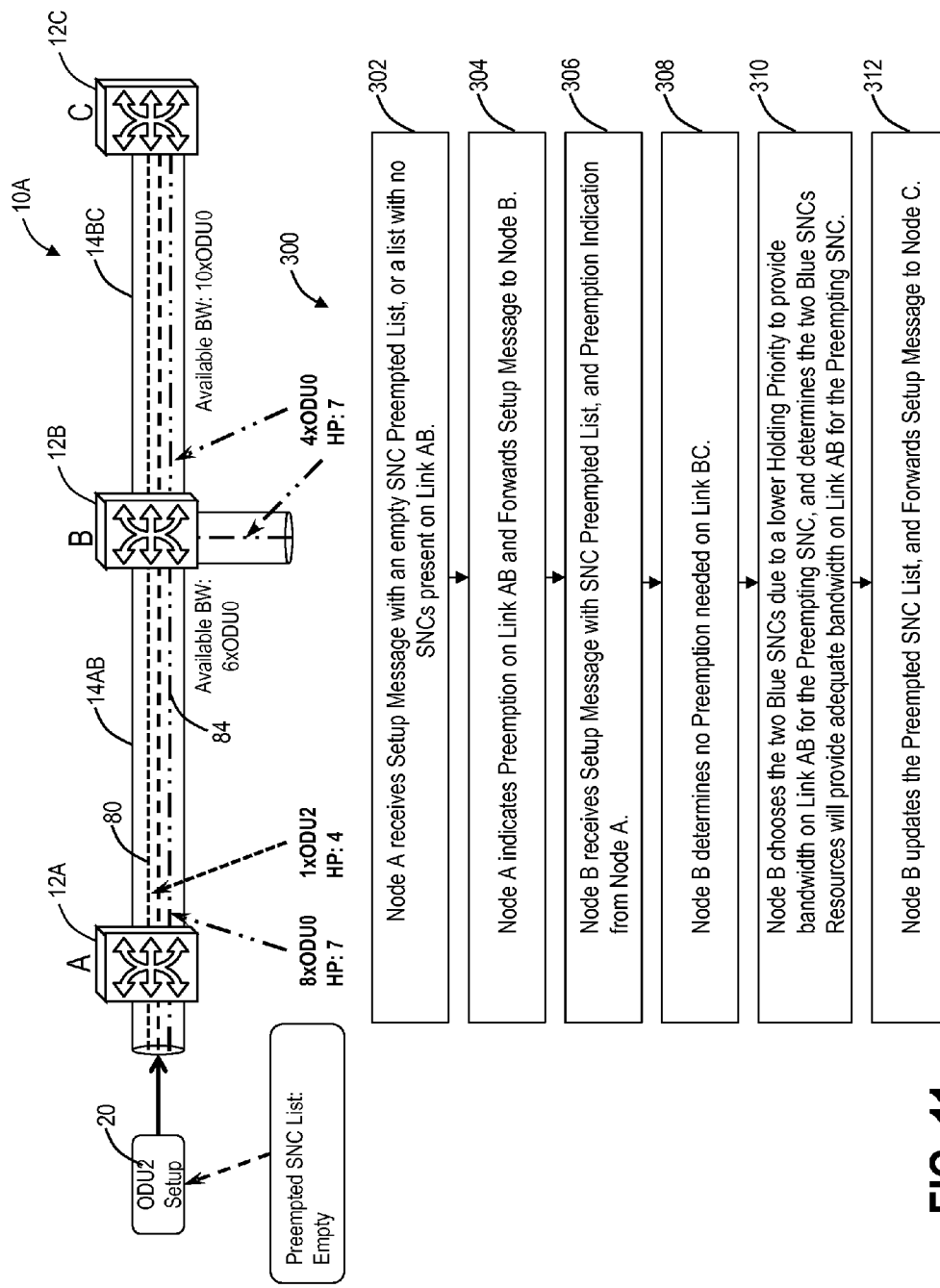
FIG. 11 is a flowchart of a seventh preemption SNC selection process.

FIG. 11 is a flowchart of a seventh preemption SNC selection process 300. In the process 300, the message 20 includes an empty preempted SNC list. Also, in this example, the Blue SNC 84 includes 8xODU0 on the link 14AB and 4xODU0 on the link 14BC. The node 12A receives the SETUP message with the empty preempted SNC list or with a list with no SNCs present on the link 14AB (step 302). The node 12A indicates preemption on the link 14AB and forwards the SETUP message 20 to the node 12B (step 304). The node 12B receives the SETUP message 20 with the preempted SNC list and the preemption indication from the node 12A (step 306). The node 12B determines no preemption is needed on the link 14BC (step 308). The node 12B chooses the two Blue SNCs 84, i.e., the 8xODU0 on the link 14AB and the 4xODU0 on the link 14BC, due to a lower Holding Priority to provide bandwidth on the link 14AB for the preempting SNC, and determines the two Blue SNCs 84 resources will provide adequate bandwidth on the link 14AB for the preempting SNC (step 310). The node 12B updates the preempted SNC list and forwards the SETUP message 20 to the node 12C (step 312).

Figure 12:
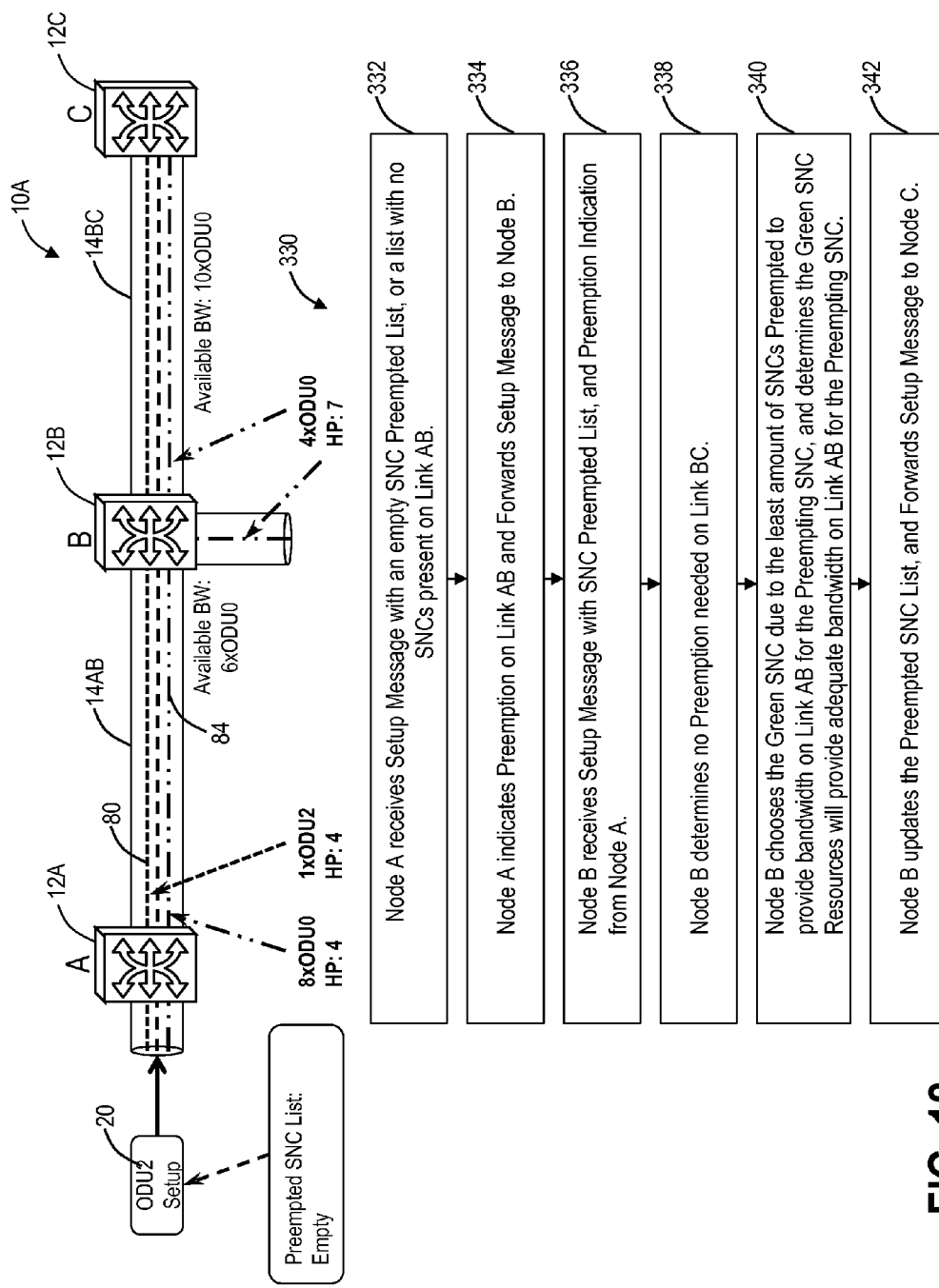
FIG. 12 is a flowchart of an eighth preemption SNC selection process.

FIG. 12 is a flowchart of an eighth preemption SNC selection process 330. In the process 330, the message 20 includes an empty preempted SNC list. Also, in this example, the Blue SNC 84 includes 8xODU0 on the link 14AB and 4xODU0 on the link 14BC. The node 12A receives the SETUP message with the empty preempted SNC list or with a list with no SNCs present on the link 14AB (step 332). The node 12A indicates preemption on the link 14AB and forwards the SETUP message 20 to the node 12B (step 334). The node 12B receives the SETUP message 20 with the preempted SNC list and the preemption indication from the node 12A (step 336). The node 12B determines no preemption is needed on the link 14BC (step 338). The node 12B chooses the Green SNC 80 due to the least amount of SNCs preempted to provide bandwidth on the link 14AB for the preempting SNC, and determines the Green SNC 80 resources will provide adequate bandwidth the link 14AB for the preempting SNC (step 340). The node 12B updates the preempted SNC list and forwards the SETUP message 20 to the node 12C (step 342).

Figure 13:
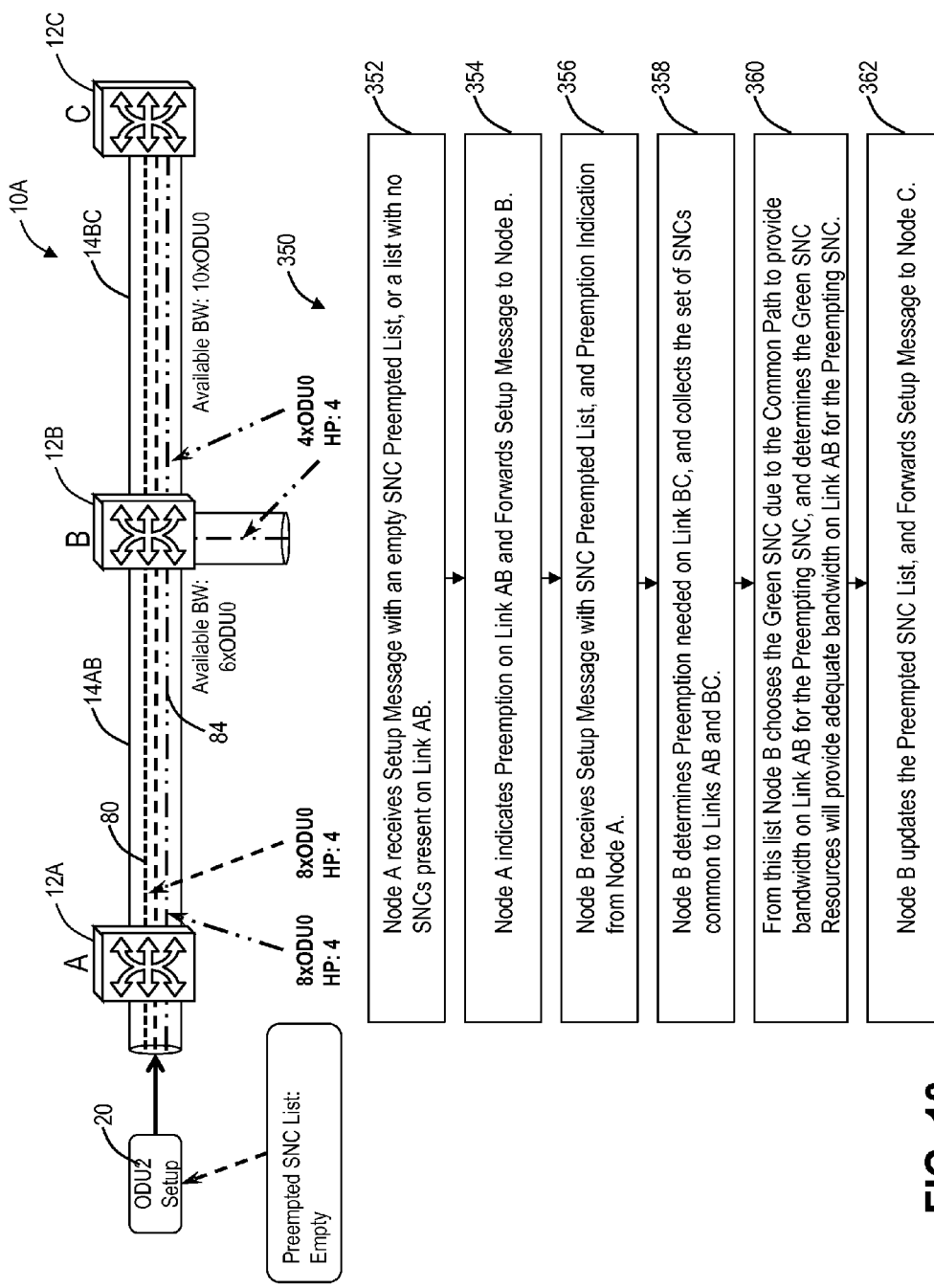
FIG. 13 is a flowchart of a ninth preemption SNC selection process.

FIG. 13 is a flowchart of a ninth preemption SNC selection process 350. In the process 350, the message 20 includes an empty preempted SNC list. Also, in this example, the Blue SNC 84 includes 8xODU0 on the link 14AB and 4xODU0 on the link 14BC. The node 12A receives the SETUP message with the empty preempted SNC list or with a list with no SNCs present on the link 14AB (step 352). The node 12A indicates preemption on the link 14AB and forwards the SETUP message 20 to the node 12B (step 354). The node 12B receives the SETUP message 20 with the preempted SNC list and the preemption indication from the node 12A (step 356). The node 12B determines preemption is needed on the link 14BC and collects the set of SNCs common to the links 14AB, 14BC (step 358). From this list, the node 12B chooses the Green SNC 80 due to the common path to provide bandwidth on the link 14AB for the preempting SNC, and determines the Green SNC 80 resources will provide adequate bandwidth on the link 14AB for the preempting SNC (step 360). The node 12B updates the preempted SNC list and forwards the SETUP message 20 to the node 12C (step 362).

Figure 14:
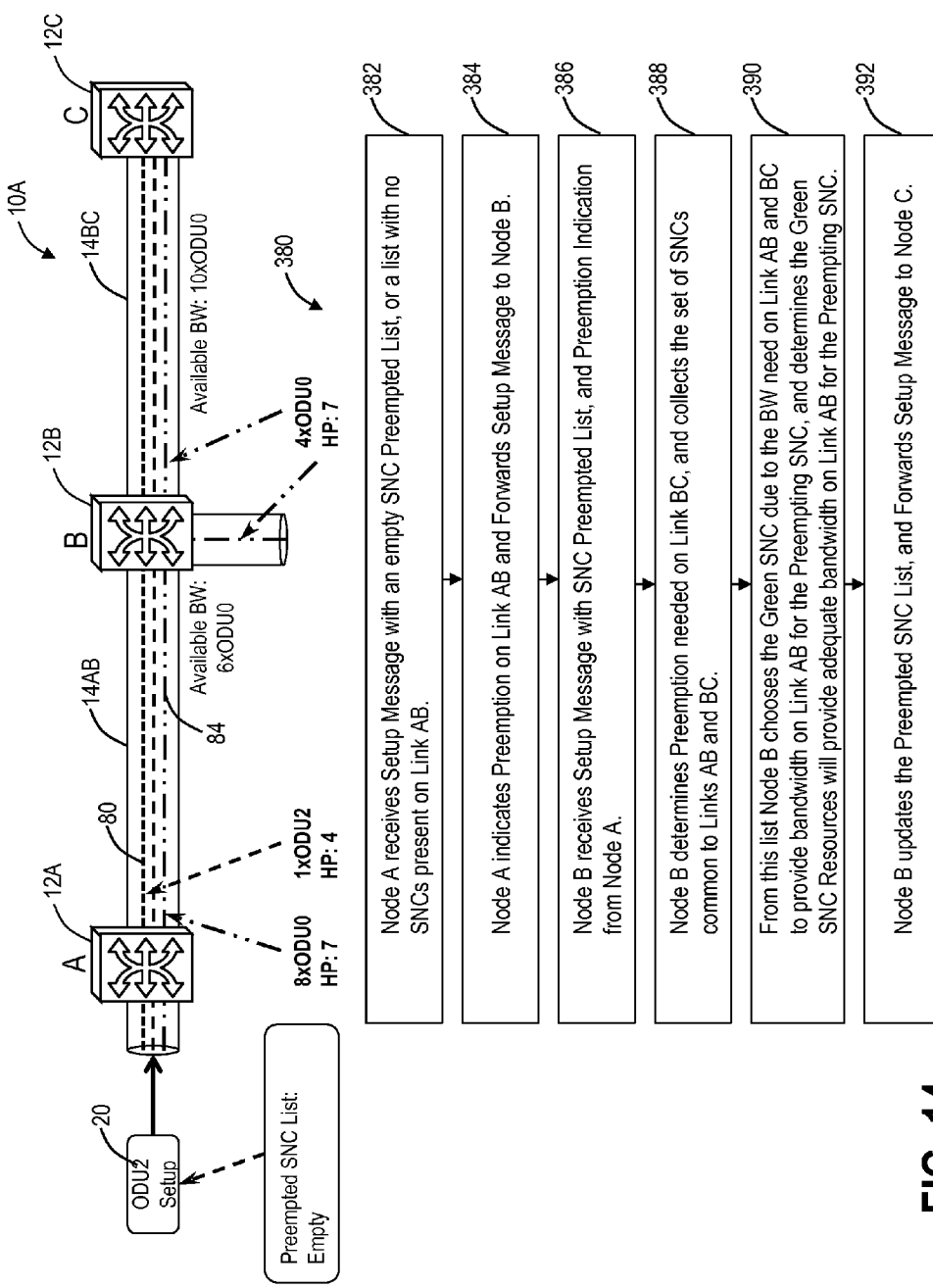
FIG. 14 is a flowchart of a tenth preemption SNC selection process.

FIG. 14 is a flowchart of a tenth preemption SNC selection process 380. In the process 380, the message 20 includes an empty preempted SNC list. Also, in this example, the Blue SNC 84 includes 8xODU0 on the link 14AB and 4xODU0 on the link 14BC. The node 12A receives the SETUP message with the empty preempted SNC list or with a list with no SNCs present on the link 14AB (step 382). The node 12A indicates preemption on the link 14AB and forwards the SETUP message 20 to the node 12B (step 384). The node 12B receives the SETUP message 20 with the preempted SNC list and the preemption indication from the node 12A (step 386). The node 12B determines preemption is needed on the link 14BC and collects the set of SNCs common to the links 14AB, 14BC (step 388). From this list, the node 12B chooses the Green SNC 80 due to the bandwidth need for the links 14AB, 14BC to provide bandwidth on the link 14AB for the preempting SNC, and determines the Green SNC 80 resources will provide adequate bandwidth on the link 14AB for the preempting SNC (step 390). The node 12B updates the preempted SNC list and forwards the SETUP message 20 to the node 12C (step 392).

Exemplary Network Element/Node

Referring to FIG. 15, in an exemplary embodiment, a block diagram illustrates an exemplary node 400 for use with the systems and methods described herein. In an exemplary embodiment, the exemplary node 400 can be a network element that may consolidate the functionality of a Multi-Service Provisioning Platform (MSPP), Digital Cross Connect (DCS), Ethernet and/or Optical Transport Network (OTN) switch, Wave Division Multiplexed (WDM)/Dense WDM (DWDM) platform, etc. into a single, high-capacity intelligent switching system providing Layer 0, 1, and/or 2 consolidation. In another exemplary embodiment, the node 400 can be any of an OTN Add/Drop Multiplexer (ADM), a Multi-Service Provisioning Platform (MSPP), a Digital Cross-Connect (DCS), an optical cross-connect, an optical switch, a router, a switch, a Wavelength Division Multiplexing (WDM) terminal, an access/aggregation device, etc. That is, the node 400 can be any digital system with ingress and egress digital signals and switching of channels, timeslots, tributary units, etc. While the node 400 is generally shown as an optical network element, the systems and methods contemplated for use with any switching fabric, network element, or network based thereon.

In an exemplary embodiment, the node 400 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460 (as well as a Path Computation Element (PCE), Software Defined Network (SDN) controller, OpenFlow controller, etc.). The management system 450 can include a network management system (NMS), element management system (EMS), or the like. Additionally, the common equipment 410 can include a control plane processor, such as a controller 500 illustrated in FIG. 16 configured to operate the control plane as described herein. The node 400 can include an interface 470 for communicatively coupling the common equipment 410, the line modules 420, and the switch modules 430 to one another. For example, the interface 470 can be a backplane, midplane, a bus, optical or electrical connectors, or the like. The line modules 420 are configured to provide ingress and egress to the switch modules 430 and to external connections on the links to/from the node 400. In an exemplary embodiment, the line modules 420 can form ingress and egress switches with the switch modules 430 as center stage switches for a three-stage switch, e.g. a three-stage Clos switch. Other configurations and/or architectures are also contemplated. The line modules 420 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 420 can include a plurality of optical connections per module and each module may include a flexible rate support for any type of connection, such as, for example, 155 MB/s, 622 MB/s, 1 GB/s, 2.5 GB/s, 10 GB/s, 40 GB/s, and 100 GB/s, N×1.25 GB/s, and any rate in between as well as future higher rates. The line modules 420 can include wavelength division multiplexing interfaces, short reach interfaces, and the like, and can connect to other line modules 420 on remote network elements, end clients, edge routers, and the like, e.g. forming connections on the links in the network 100. From a logical perspective, the line modules 420 provide ingress and egress ports to the node 400, and each line module 420 can include one or more physical ports. The switch modules 430 are configured to switch channels, timeslots, tributary units, packets, etc. between the line modules 420. For example, the switch modules 430 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 430 can include Time Division Multiplexed (TDM) (i.e., circuit switching) and/or packet switching engines. The switch modules 430 can include redundancy as well, such as 1:1, 1:N, etc. In an exemplary embodiment, the switch modules 430 provide OTN switching and/or Ethernet switching.

Those of ordinary skill in the art will recognize the node 400 can include other components which are omitted for illustration purposes, and that the systems and methods described herein are contemplated for use with a plurality of different network elements with the node 400 presented as an exemplary type of network element. For example, in another exemplary embodiment, the node 400 may not include the switch modules 430, but rather have the corresponding functionality in the line modules 420 (or some equivalent) in a distributed fashion. For the node 400, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 400 is merely presented as one exemplary node 400 for the systems and methods described herein.

In an exemplary embodiment, the node 400 is in the network 10 and configured to perform service preemption selection. The node 400 can include a first port coupled to an ingress link, wherein the first port is configured to receive a request to establish a service on a path in the network while preempting one or more existing services if required to establish the service, wherein the request includes a list of any previously selected services for preemption and an indication of whether preemption is required on the ingress link; a controller configured to select, if required based on the indication, one or more services for preemption on the ingress link based on service selection criteria; and a second port configured to forward the request on an egress link to an adjacent node with any updates based on the one or more services for preemption. The ports can be part of the line modules 420 and the controller can be part of the common equipment 410. The one or more services for preemption can be selected with the list including a backward view of the previously selected services for preemption and a limited forward view where the node performs the selecting at a far end of the ingress link. The controller can be further configured to determine whether preemption is required on the egress link, and if required, providing an indication of whether preemption is required on the egress link prior to the second port forwarding the forward the request on the egress link. The updates can include the addition of the one or more services for preemption in the request.

The service selection criteria can be a hierarchical approach for determining the one or more services for preemption based first on the list, second on a common path between the ingress link and the egress link, and third based on characteristics of the one or more services for preemption. The network can utilize one of (i) a distributed control plane and (ii) a hybrid control mode with both a control plane and a Software Defined Networking (SDN) controller. The network can utilize a hybrid control mode with both a control plane and a Software Defined Networking (SDN) controller, and wherein the SDN controller provides suggestions for how the controller selects the one or more services for preemption. The node and each intermediate node in the network for the service can be configured to perform the preemption, and wherein the list can be utilized to select previously selected services to minimize disruption in the network.

Exemplary Controller

Figure 16:
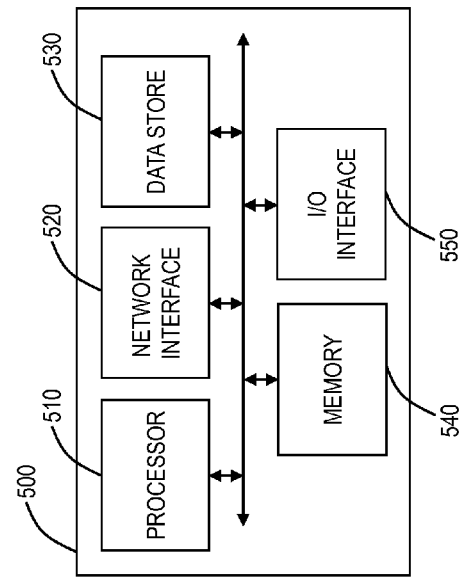
FIG. 16 is a block diagram of a controller to provide control plane processing and/or operations, administration, maintenance, and provisioning (OAM&P) for the node, and/or to implement a Software Defined Networking (SDN) controller.

Referring to FIG. 16, in an exemplary embodiment, a block diagram illustrates a controller 500 to provide control plane processing and/or operations, administration, maintenance, and provisioning (OAM&P) for the node 400, and/or to implement a Software Defined Networking (SDN) controller. The controller 500 can be part of the common equipment, such as common equipment 410 in the node 400, or a stand-alone device communicatively coupled to the node 400 via the DCN 460. In a stand-alone configuration, the controller 500 can be an SDN controller, an NMS, a PCE, etc. The controller 500 can include a processor 510 which is a hardware device for executing software instructions such as operating the control plane. The processor 510 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 510 is configured to execute software stored within memory, to communicate data to and from the memory, and to generally control operations of the controller 500 pursuant to the software instructions. The controller 500 can also include a network interface 520, a data store 530, memory 540, an I/O interface 550, and the like, all of which are communicatively coupled to one another and with the processor 510.

The network interface 520 can be used to enable the controller 500 to communicate on the DCN 460, such as to communicate control plane information to other controllers, to the management system 450, to the nodes 400, and the like. The network interface 520 can include, for example, an Ethernet card (e.g., 10BaseT, Fast Ethernet, Gigabit Ethernet) or a wireless local area network (WLAN) card (e.g., 802.11). The network interface 520 can include address, control, and/or data connections to enable appropriate communications on the network. The data store 530 can be used to store data, such as control plane information, provisioning data, OAM&P data, etc. The data store 530 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 530 can incorporate electronic, magnetic, optical, and/or other types of storage media. The memory 540 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 540 may incorporate electronic, magnetic, optical, and/or other types of storage media. Note that the memory 540 can have a distributed architecture, where various components are situated remotely from one another, but may be accessed by the processor 510. The I/O interface 550 includes components for the controller 500 to communicate with other devices. Further, the I/O interface 550 includes components for the controller 500 to communicate with the other nodes, such as using overhead associated with OTN signals.

In an exemplary embodiment, the controller 500 is configured to communicate with other controllers 500 in the network 10 to operate the control plane for control plane signaling. This communication may be either in-band or out-of-band. For SONET networks and similarly for SDH networks, the controllers 500 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 500 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 500 is configured to operate the control plane 16 in the network 10. That is, the controller 500 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 500 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus a plurality of the controllers 500 can act together to operate the control plane using the control plane signaling to maintain database synchronization. In source-based routing, the controller 500 at a source node for a connection is responsible for path computation and establishing by signaling other controllers 500 in the network 10, such as through the SETUP message 20 which can include preemption. For example, the source node and its controller 500 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc. One aspect of path computation is preemption for a higher priority service.

Service Preemption Selection Process

Referring to FIG. 17, in an exemplary embodiment, a flowchart illustrates a process 600 of service preemption selection implemented by a node in a network. The process 600 includes receiving, from an ingress link, a request to establish a service on a path in the network while preempting one or more existing services if required to establish the service, wherein the request includes a list of any previously selected services for preemption and an indication of whether preemption is required on the ingress link (step 602); selecting, if required based on the indication, one or more services for preemption on the ingress link based on service selection criteria (step 604); and forwarding the request on an egress link to an adjacent node with any updates based on the selecting (step 606). The process 600 can include determining whether preemption is required on the egress link, and if required, providing an indication of whether preemption is required on the egress link prior to the forwarding to the adjacent node (step 608). The selecting can be performed with the list including a backward view of the previously selected services for preemption and a limited forward view where the node performs the selecting at a far end of the ingress link. The updates can include the addition of the one or more services for preemption in the request.

The service selection criteria can be a hierarchical approach for determining the one or more services for preemption based first on the list, second on a common path between the ingress link and the egress link, and third based on characteristics of the one or more services for preemption. The network can utilize one of (i) a distributed control plane and (ii) a hybrid control mode with both a control plane and a Software Defined Networking (SDN) controller. The network can utilize a hybrid control mode with both a control plane and a Software Defined Networking (SDN) controller, and wherein the SDN controller provides suggestions for the selecting in the request. The node and each intermediate node in the network for the service can be configured to perform the selecting, and wherein the list is utilized to select previously selected services to minimize disruption in the network.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of service preemption selection implemented by a node in a network, the method comprising:
    receiving, from an ingress link, a request to establish a service on a path in the network while preempting one or more existing services if required to establish the service, wherein the request comprises a list of any previously selected services for preemption and an indication of whether preemption is required on the ingress link;
    selecting, if required based on the indication, one or more services for preemption on the ingress link based on service selection criteria; and
    forwarding the request on an egress link to an adjacent node with any updates based on the selecting,
    wherein the network utilizes a hybrid control mode with both a control plane and a Software Defined Networking (SDN) controller, and wherein the SDN controller provides suggestions for the selecting in the request.

2. The method of claim 1, wherein the selecting is performed with the list comprising a backward view of the previously selected services for preemption and a limited forward view where the node performs the selecting based in part on the egress link.

3. The method of claim 1, further comprising:
    determining whether preemption is required on the egress link, and if required, providing an indication of whether preemption is required on the egress link during the forwarding to the adjacent node.

4. The method of claim 1, wherein the updates comprise addition of the one or more services for preemption in the request.

5. The method of claim 1, wherein the service selection criteria is a hierarchical approach for determining the one or more services for preemption based first on the list, second on a common path between the ingress link and the egress link, and third based on characteristics of the one or more services for preemption.

6. The method of claim 1, wherein the network utilizes one of (i) a distributed control plane and (ii) a hybrid control mode with both a control plane and a Software Defined Networking (SDN) controller.

7. The method of claim 1, wherein the node and each intermediate node in the network for the service are configured to perform the selecting, and wherein the list is utilized to select previously selected services to minimize disruption in the network.

8. A node in a network configured to perform service preemption selection, the node comprising:
- a first port coupled to an ingress link, wherein the first port is configured to receive a request to establish a service on a path in the network while preempting one or more existing services if required to establish the service, wherein the request comprises a list of any previously selected services for preemption and an indication of whether preemption is required on the ingress link;
- a controller configured to select, if required based on the indication, one or more services for preemption on the ingress link based on service selection criteria; and
- a second port configured to forward the request on an egress link to an adjacent node with any updates based on the one or more services for preemption,
- wherein the network utilizes a hybrid control mode with both a control plane and a Software Defined Networking (SDN) controller, and wherein the SDN controller provides suggestions for how the controller selects the one or more services for preemption.

9. The node of claim 8, wherein the one or more services for preemption are selected with the list comprising a backward view of the previously selected services for preemption and a limited forward view where the node performs the selecting based in part on the egress link.

10. The node of claim 8, wherein the controller is further configured to determine whether preemption is required on the egress link, and if required, providing an indication of whether preemption is required on the egress link when the second port forwards the request on the egress link.

11. The node of claim 8, wherein the updates comprise addition of the one or more services for preemption in the request.

12. The node of claim 8, wherein the service selection criteria is a hierarchical approach for determining the one or more services for preemption based first on the list, second on a common path between the ingress link and the egress link, and third based on characteristics of the one or more services for preemption.

13. The node of claim 8, wherein the network utilizes one of (i) a distributed control plane and (ii) a hybrid control mode with both a control plane and a Software Defined Networking (SDN) controller.

14. The node of claim 8, wherein the node and each intermediate node in the network for the service are configured to perform the preemption, and wherein the list is utilized to select previously selected services to minimize disruption in the network.

15. A network configured to perform service preemption selection by one or more nodes, the network comprising:
- a plurality of nodes interconnected to one another by a plurality of links;
- wherein an intermediate node is configured to
    - receive, from an ingress link, a request to establish a service on a path in the network while preempting one or more existing services if required to establish the service, wherein the request comprises a list of any previously selected services for preemption and an indication of whether preemption is required on the ingress link,
    - select, if required based on the indication, one or more services for preemption on the ingress link based on service selection criteria, and
    - forward the request on an egress link to an adjacent node with any updates based on the selecting,
- wherein the network utilizes a hybrid control mode with both a control plane and a Software Defined Networking (SDN) controller, and wherein the SDN controller provides suggestions for how the controller selects the one or more services for preemption.

16. The network of claim 15, wherein the one or more services for preemption are selected with the list comprising a backward view of the previously selected services for preemption and a limited forward view where the intermediate node performs the selecting based in part on the egress link.

17. The network of claim 15, wherein the intermediate node is configured to determine whether preemption is required on the egress link, and if required, provide an indication of whether preemption is required on the egress link when forwarding to the adjacent node and an indication of any service preempted on the ingress link.

18. The network of claim 15, wherein the network utilizes one of (i) a distributed control plane and (ii) a hybrid control mode with both a control plane and a Software Defined Networking (SDN) controller.

* * * * *